United States Patent
Heggebø et al.

(10) Patent No.: US 12,179,806 B2
(45) Date of Patent: Dec. 31, 2024

(54) METHOD OF OPERATING AN AUTOMATED STORAGE AND RETRIEVAL SYSTEM

(71) Applicant: Autostore Technology AS, Nedre Vats (NO)

(72) Inventors: Jørgen Djuve Heggebø, Olen (NO); Ole Alexander Mæhle, Etne (NO); Synnøve Matre, Sandeid (NO); Ingvar Fagerland, Kolnes (NO); Ragnar Stuhaug, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 773 days.

(21) Appl. No.: 15/734,868

(22) PCT Filed: Jun. 11, 2019

(86) PCT No.: PCT/EP2019/065201
§ 371 (c)(1),
(2) Date: Dec. 3, 2020

(87) PCT Pub. No.: WO2019/238670
PCT Pub. Date: Dec. 19, 2019

(65) Prior Publication Data
US 2021/0237973 A1    Aug. 5, 2021

(30) Foreign Application Priority Data

Jun. 12, 2018 (NO) .................................. 20180813
Jul. 19, 2018 (NO) .................................. 20181005
(Continued)

(51) Int. Cl.
*B61B 13/00* (2006.01)
*B65G 1/04* (2006.01)
(Continued)

(52) U.S. Cl.
CPC ............ *B61B 13/00* (2013.01); *B65G 1/0414* (2013.01); *B65G 1/0457* (2013.01);
(Continued)

(58) Field of Classification Search
CPC .................. B65G 1/0492; B65G 43/00; B65G 2203/0283
(Continued)

(56) References Cited

U.S. PATENT DOCUMENTS 3,519,150 A    7/1970  Keena et al.
3,800,963 A    4/1974  Holland
(Continued)

FOREIGN PATENT DOCUMENTS

CA    2988122 A1    12/2016
CN    1980843 A     6/2007
(Continued)

OTHER PUBLICATIONS

United States Office Action in related U.S. Appl. No. 16/972,482, dated Mar. 22, 2022 (46 pages).
(Continued)

*Primary Examiner* — Jacob S. Scott
*Assistant Examiner* — Michael E Butler
(74) *Attorney, Agent, or Firm* — Baker Botts L.L.P.

(57) ABSTRACT

A method of operating an automated storage and retrieval system includes: a rail system including a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane including a plurality of adjacent grid cells, a central control unit configured to receive, transmit and process data signals of a plurality of container handling vehicles for handling
(Continued)

storage containers of the automated storage and retrieval system. Each container handling vehicle includes a vehicle body, a wheel assembly provided on the vehicle body, the wheel assembly being configured to move the vehicle along the rail system in both of the first direction and the second direction, a vehicle control unit configured to receive data signals from, transmit data signals to and process data signals of the central control unit, and a proximity sensor system configured to detect another container handling vehicle of said plurality of container handling vehicles and determine whether or not it is within a predetermined distance. The method includes detecting with the central control unit that access of a first container handling vehicle to a target cell, which is one of the plurality of grid cells, is blocked by a second container handling vehicle, transmitting a data signal from the central control unit to the vehicle control unit of the first container handling vehicle commanding the first container handling vehicle to move into the target cell when the second container handling vehicle is beyond said predetermined distance.

16 Claims, 14 Drawing Sheets

(30) Foreign Application Priority Data

Aug. 2, 2018 (NO) .................................... 20181039
Aug. 21, 2018 (NO) .................................... 20181098

(51) Int. Cl.
| | | |
|---|---|---|
| B65G 1/06 | (2006.01) | |
| B65G 1/137 | (2006.01) | |
| B65G 47/06 | (2006.01) | |
| B65G 47/52 | (2006.01) | |
| B65G 57/03 | (2006.01) | |
| B65G 63/06 | (2006.01) | |
| B65G 65/23 | (2006.01) | |
| B65G 67/24 | (2006.01) | |
| B66F 9/06 | (2006.01) | |
| B66F 9/19 | (2006.01) | |
| G05D 1/00 | (2006.01) | |
| B60W 50/00 | (2006.01) | |
| B65G 43/00 | (2006.01) | |
| B65G 63/00 | (2006.01) | |

(52) U.S. Cl.
CPC ......... *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 50/0098* (2013.01); *B60W 2710/06* (2013.01); *B60W 2720/10* (2013.01); *B60W 2720/24* (2013.01); *B65G 1/1378* (2013.01); *B65G 43/00* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01)

(58) Field of Classification Search
USPC .......................................................... 700/218
See application file for complete search history.

(56) References Cited

U.S. PATENT DOCUMENTS

| | | |
|---|---|---|
| 4,538,950 A | 9/1985 | Shiomi et al. |
| 4,909,697 A | 3/1990 | Bernard, II et al. |
| 5,078,566 A | 1/1992 | Ferrence |
| 5,360,306 A | 11/1994 | Nakayama et al. |
| 5,538,809 A | 7/1996 | Bittihn et al. |
| 7,101,139 B1 | 9/2006 | Benedict |
| 8,628,289 B1 | 1/2014 | Benedict et al. |
| 9,527,669 B1 | 12/2016 | Hanssen et al. |
| 2003/0093176 A1 | 5/2003 | Ohtsuka et al. |
| 2005/0047895 A1 | 3/2005 | Lert |
| 2005/0118003 A1 | 6/2005 | Mitchell et al. |
| 2008/0014062 A1 | 1/2008 | Yuyama et al. |
| 2008/0147306 A1 | 6/2008 | Hayashi |
| 2008/0269960 A1 | 10/2008 | Kostmann |
| 2011/0027059 A1 | 2/2011 | Benedict et al. |
| 2012/0282068 A1 | 11/2012 | Tschurwald et al. |
| 2013/0103552 A1 | 4/2013 | Hoffman et al. |
| 2013/0302132 A1 | 11/2013 | D'Andrea |
| 2014/0014470 A1 | 1/2014 | Razumov |
| 2014/0086714 A1 | 3/2014 | Malik |
| 2014/0277693 A1 | 9/2014 | Naylor |
| 2014/0288696 A1 | 9/2014 | Lert |
| 2014/0292274 A1 | 10/2014 | Dorval et al. |
| 2015/0127143 A1 | 5/2015 | Lindbo et al. |
| 2016/0060033 A1 | 3/2016 | Izumi |
| 2016/0060037 A1 | 3/2016 | Razumov |
| 2016/0137435 A1 | 5/2016 | Tanaka et al. |
| 2016/0145058 A1 | 5/2016 | Lindbo |
| 2016/0176638 A1 | 6/2016 | Toebes |
| 2016/0325932 A1 | 11/2016 | Hognaland |
| 2017/0050809 A1 | 2/2017 | Itoh et al. |
| 2017/0057745 A1 | 3/2017 | Ueda et al. |
| 2017/0166400 A1 | 6/2017 | Hofmann |
| 2017/0183156 A1 | 6/2017 | Yoshioka et al. |
| 2018/0037410 A1 | 2/2018 | DeWitt |
| 2018/0044110 A1 | 2/2018 | Clarke et al. |
| 2018/0068253 A1 | 3/2018 | Simms et al. |
| 2018/0082162 A1 | 3/2018 | Durham et al. |
| 2018/0118078 A1 | 5/2018 | Alkhaldi et al. |
| 2018/0141754 A1 | 5/2018 | Garrett et al. |
| 2018/0150793 A1 | 5/2018 | Lert, Jr. et al. |
| 2019/0271988 A1* | 9/2019 | High ................. G01C 21/3438 |
| 2019/0361464 A1* | 11/2019 | Ahnell ............. G05B 19/41895 |
| 2020/0148474 A1 | 5/2020 | Salichs et al. |
| 2023/0112249 A1* | 4/2023 | Lindbo ................ B65G 1/0464 |
| 2023/0312244 A1* | 10/2023 | Lindbo ............... G07F 11/1657 |

FOREIGN PATENT DOCUMENTS

| | | |
|---|---|---|
| CN | 101553416 A | 10/2009 |
| CN | 101711210 A | 5/2010 |
| CN | 102050333 A | 5/2011 |
| CN | 102992012 A | 3/2013 |
| CN | 103399574 A | 11/2013 |
| CN | 104066661 A | 9/2014 |
| CN | 104781163 A | 7/2015 |
| CN | 104828450 A | 8/2015 |
| CN | 104885106 A | 9/2015 |
| CN | 105383848 A | 3/2016 |
| CN | 105517923 A | 4/2016 |
| CN | 105899398 A | 8/2016 |
| CN | 105947514 A | 9/2016 |
| CN | 106064718 A | 11/2016 |
| CN | 106241154 A | 12/2016 |
| CN | 106414278 A | 2/2017 |
| CN | 106575391 A | 4/2017 |

(56) References Cited

FOREIGN PATENT DOCUMENTS

| | | |
|---|---|---|
| CN | 106660703 A | 5/2017 |
| CN | 106662874 A | 5/2017 |
| CN | 106829298 A | 6/2017 |
| CN | 206750711 U | 12/2017 |
| CN | 206790852 U | 12/2017 |
| CN | 107922119 A | 4/2018 |
| CN | 108137229 A | 6/2018 |
| CN | 108140168 A | 6/2018 |
| DE | 40 16 810 C1 | 11/1991 |
| DE | 9310690 U1 | 9/1993 |
| DE | 102009017241 A1 | 10/2010 |
| DE | 102013009340 A1 | 12/2014 |
| EP | 0133472 A2 | 2/1985 |
| EP | 0458021 A1 | 11/1991 |
| EP | 0534558 A1 | 3/1993 |
| EP | 2881905 A1 | 6/2015 |
| EP | 3003932 A1 | 4/2016 |
| EP | 3288865 A1 | 3/2018 |
| GB | 1 267 751 A | 3/1972 |
| GB | 1 276 160 A | 6/1972 |
| GB | 2106070 A | 4/1983 |
| GB | 2211822 A | 7/1989 |
| GB | 2233319 A | 1/1991 |
| JP | S60-137703 A | 7/1985 |
| JP | S6417707 A | 1/1989 |
| JP | S6485656 A | 3/1989 |
| JP | H06043936 A | 2/1994 |
| JP | H07125811 A | 5/1995 |
| JP | H07-067623 B2 | 7/1995 |
| JP | H08-217209 A | 8/1996 |
| JP | H09-152914 A | 6/1997 |
| JP | H11-143538 A | 5/1999 |
| JP | 2000-044010 A | 2/2000 |
| JP | 2000-191106 A | 7/2000 |
| JP | 2001-192103 A | 7/2001 |
| JP | 2003-137406 A | 5/2003 |
| JP | 2009-184775 A | 8/2009 |
| JP | 2011/102166 A | 5/2011 |
| JP | 2015-535517 A | 12/2015 |
| JP | 2017-088404 A | 5/2017 |
| JP | 2017-524625 A | 8/2017 |
| KR | 20170026074 A | 3/2017 |
| NO | 317366 B1 | 10/2004 |
| RU | 2008111257 A | 10/2009 |
| WO | 96/14258 A1 | 5/1996 |
| WO | 2007/149711 A2 | 12/2007 |
| WO | 2011002478 A2 | 1/2011 |
| WO | 2012/106746 A1 | 8/2012 |
| WO | 2014/075937 A1 | 5/2014 |
| WO | 2014/090684 A1 | 6/2014 |
| WO | 2014/195901 A1 | 12/2014 |
| WO | 2014/203126 A1 | 12/2014 |
| WO | 2015/084236 A1 | 6/2015 |
| WO | 2015/170660 A1 | 11/2015 |
| WO | 2015/185628 A2 | 12/2015 |
| WO | 2015/193278 A1 | 12/2015 |
| WO | 2016/166294 A1 | 10/2016 |
| WO | 2016/166323 A1 | 10/2016 |
| WO | 2016/172253 A1 | 10/2016 |
| WO | 2016172793 A1 | 11/2016 |
| WO | 2016/196815 A1 | 12/2016 |
| WO | 2016/198467 A1 | 12/2016 |
| WO | 2016198565 A1 | 12/2016 |
| WO | 2017/037095 A1 | 3/2017 |
| WO | 2017/081273 A1 | 5/2017 |
| WO | 2017/081281 A1 | 5/2017 |
| WO | 2017/121512 A1 | 7/2017 |
| WO | 2017/121515 A1 | 7/2017 |
| WO | 2017/144054 A1 | 8/2017 |
| WO | 2017/148963 A1 | 9/2017 |
| WO | 2017/153563 A1 | 9/2017 |
| WO | 2017/211640 A1 | 12/2017 |
| WO | 2017/220651 A1 | 12/2017 |
| WO | 2018/082972 A1 | 5/2018 |
| WO | 2018/162757 A1 | 9/2018 |

OTHER PUBLICATIONS

Office Action issued in the counterpart Chinese Patent Application No. 201980037723X, dated Sep. 17, 2021 (25 pages).
Office Action issued in the counterpart Chinese Patent Application No. 2019800383353, dated Dec. 17, 2021 (3 pages).
Office Action issued in the European Application No. 19730155.9, dated Sep. 4, 2023 (6 pages).
Office Action issued in counterpart Japanese Patent Application No. 2020-568727 dated Mar. 30, 2023 (8 pages).
Office Action in counterpart Chinese Patent Application No. 201980038106.1 dated Sep. 8, 2021 (6 pages).
Office Action in counterpart Chinese Patent Application No. 2019800538763 dated Dec. 6, 2021 (13 pages).
Office Action in counterpart Chinese Patent Application No. 2019800393798 dated Dec. 9, 2021 (17 pages).
Office Action issued in Chinese Application No. 201980037162.3; dated Sep. 27, 2021 (8 pages).
Extended European Search Report issued in European Application No. 21186410.3, dated Nov. 25, 2021 (5 pages).
International Search Report issued in Application No. PCT/EP2019/065201, dated Sep. 19, 2019 (7 pages).
Written Opinion issued in International Application No. PCT/EP2019/065201, dated Sep. 19, 2019 (10 pages).
International Search Report issued in Application No. PCT/EP2019/065153, dated Sep. 12, 2019 (7 pages).
Written Opinion issued in International Application No. PCT/EP2019/065153, dated Sep. 12, 2019 (7 pages).
International Search Report issued in Application No. PCT/EP2019/065166, dated Sep. 12, 2019 (9 pages).
Written Opinion issued in International Application No. PCT/EP2019/065166, dated Sep. 12, 2019 (8 pages).
International Search Report issued in Application No. PCT/EP2019/065233, dated Sep. 12, 2019 (8 pages).
Written Opinion issued in International Application No. PCT/EP2019/065233, dated Sep. 12, 2019 (8 pages).
Search Report issued in Norwegian Application No. 20181005, dated Feb. 6, 2019 (2 pages).
Search Report issued in Norwegian Application No. 20181098, dated Jan. 29, 2019 (2 pages).
Search Report issued in Norwegian Application No. 20181039, dated Sep. 20, 2018 (3 pages).
Office Action in the counterpart Japanese Applicaiton No. 2020-568712, dated Jun. 26, 2023 (7 pages).
Office Action issued in counterpart Chinese Application No. 201980038796.0 dated Sep. 30, 2021 (17 pages).
Search Report issued in counterpart Chinese Application No. 201980038796.0 dated Sep. 30, 2021 (3 pages).
Office Action issued in counterpart Japanese Patent Application No. 2020-569128 dated Jul. 3, 2023 (6 pages).
Office Action issued in counterpart Japanese Patent Application No. 2020-568698 dated May 29, 2023 (9 pages).
Office Action issued in counterpart Japanese Patent Application No. 2020-569140 dated Jun. 2, 2023 (5 pages).
Office Action issued in counterpart Japanese Patent Application No. 2020-568714 dated Jul. 3, 2023 (16 pages).
Office Action issued in counterpart Japanese Patent Application No. 2020-568805 dated Jun. 5, 2023 (7 pages).
Office Action in counterpart Chinese Patent Application No. 201980039028.7 dated Oct. 27, 2021 (15 pages).
Office Action in counterpart Chinese Patent Application No. 201980039046.5 dated Sep. 15, 2021 (18 pages).
Office Action in counterpart Chinese Patent Application No. 201980039068.1 dated Sep. 15, 2021 (23 pages).
Office Action in counterpart Chinese Patent Application No. 201980038856.9 dated Oct. 19, 2021 (16 pages).
Extended European Search Report issued in counterpart European Application No. 23 20 6670.4 mailed on Jan. 30, 2024 (11 pages).
Uchida, Mari, Notice of Reasons for Refusal for Japanese Patent Application No. JP2023162913, dated Oct. 1, 2024, 9 pages, pub. by JPO, Japan.

(56) References Cited

OTHER PUBLICATIONS

Hoffert, Rudi, Extended European Search Report for European patent application No. EP24189759.4, dated Oct. 28, 2024, 10 pages, published by the European Patent Office, Munich, Germany.

* cited by examiner

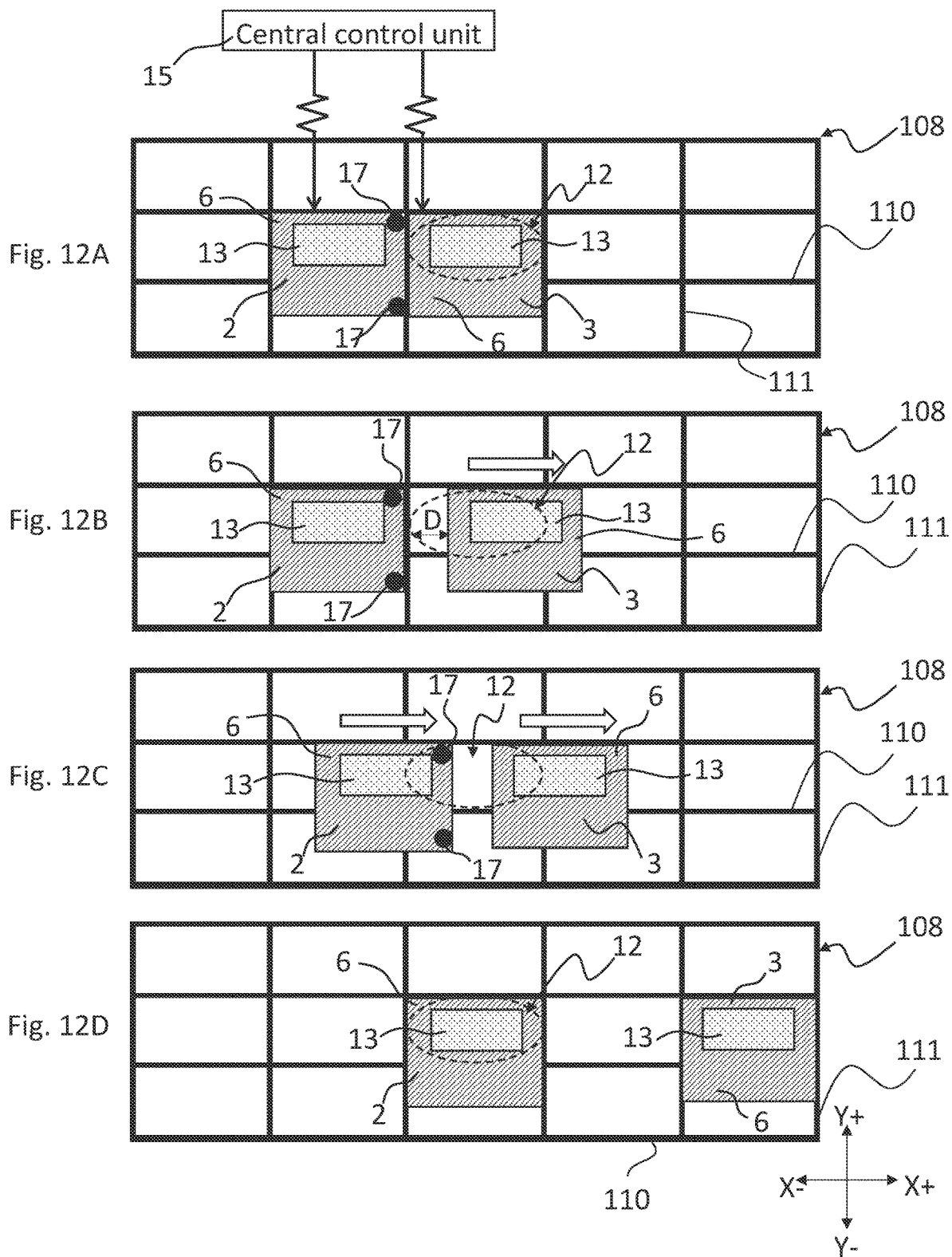

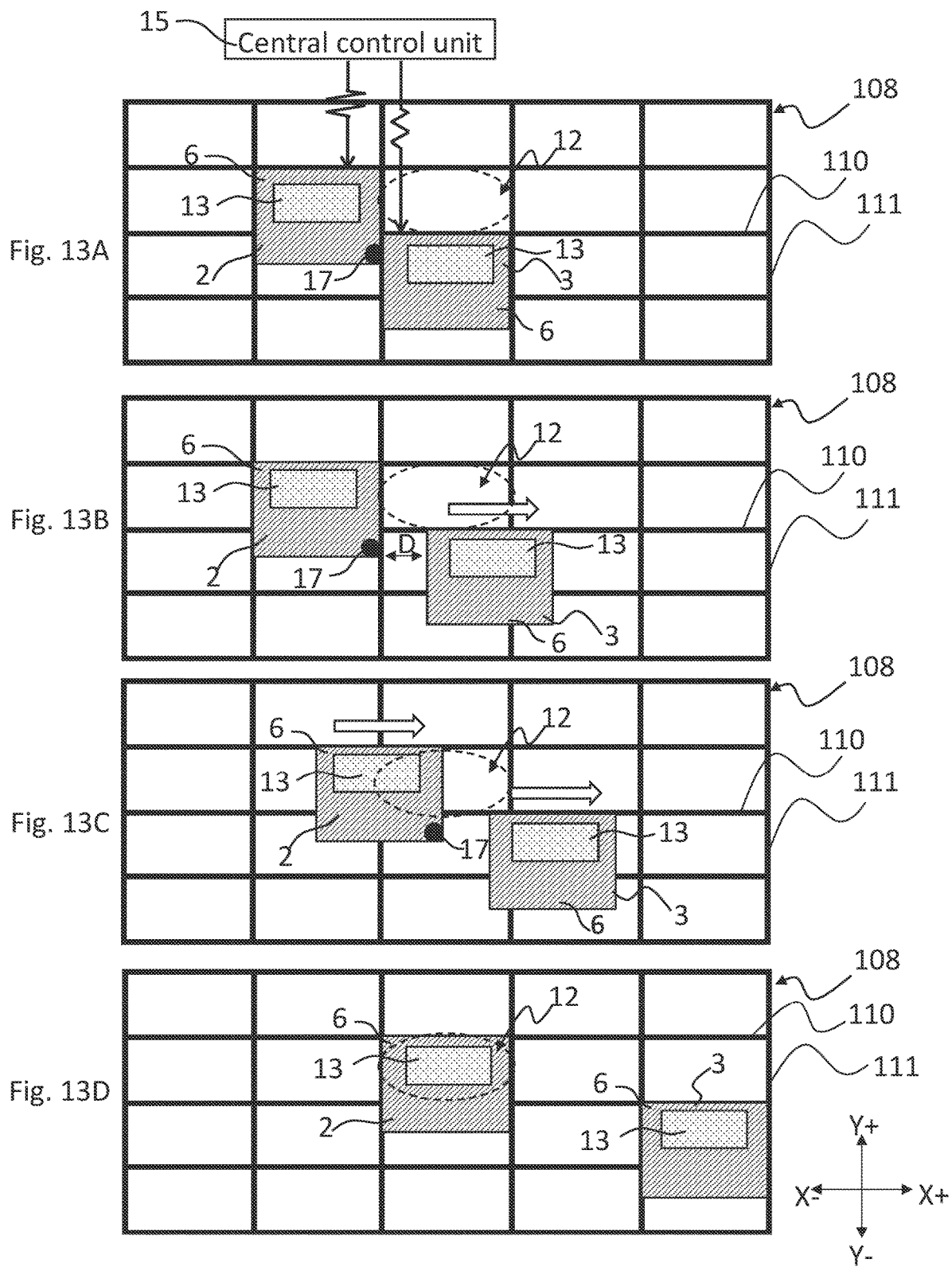

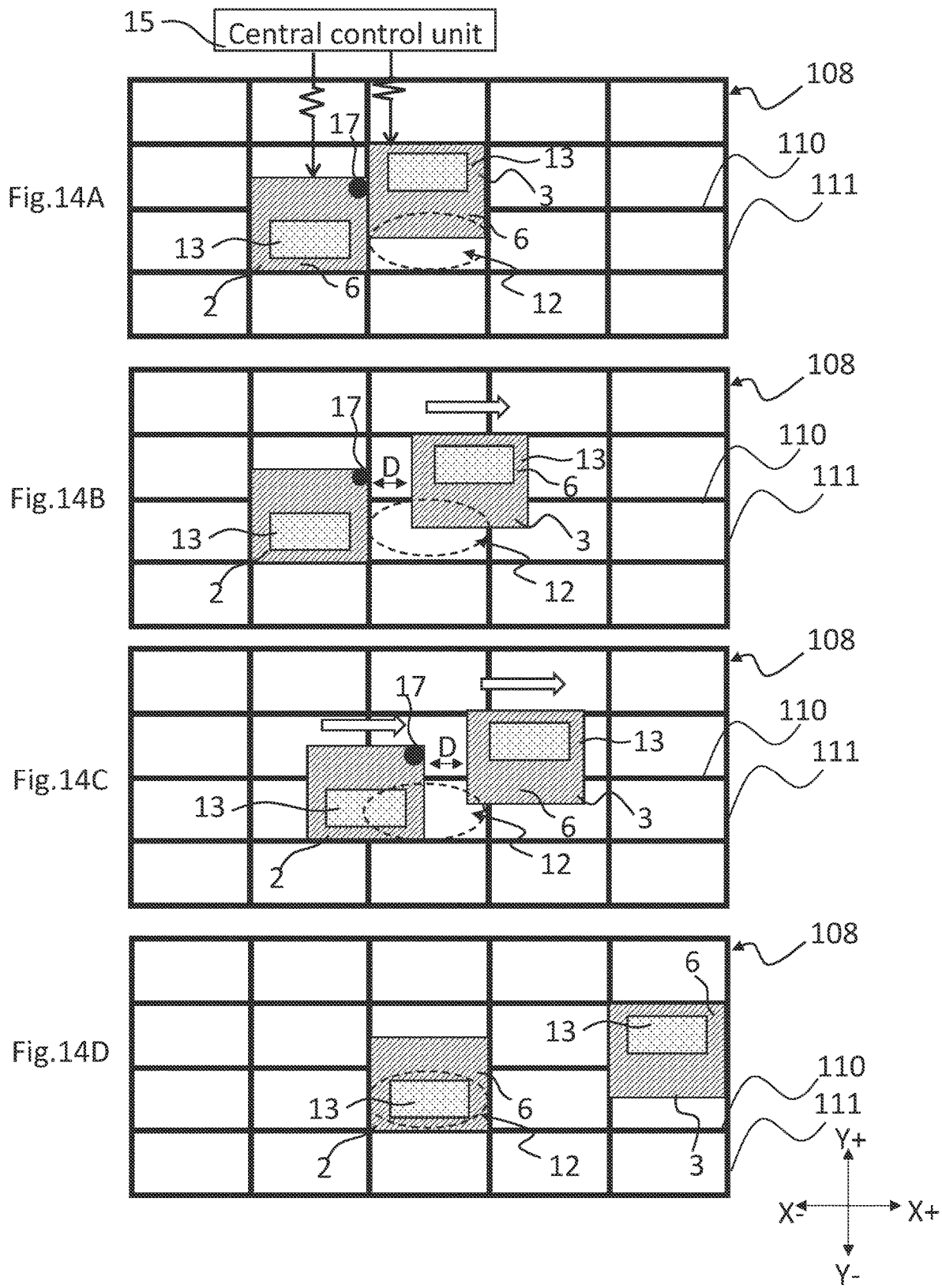

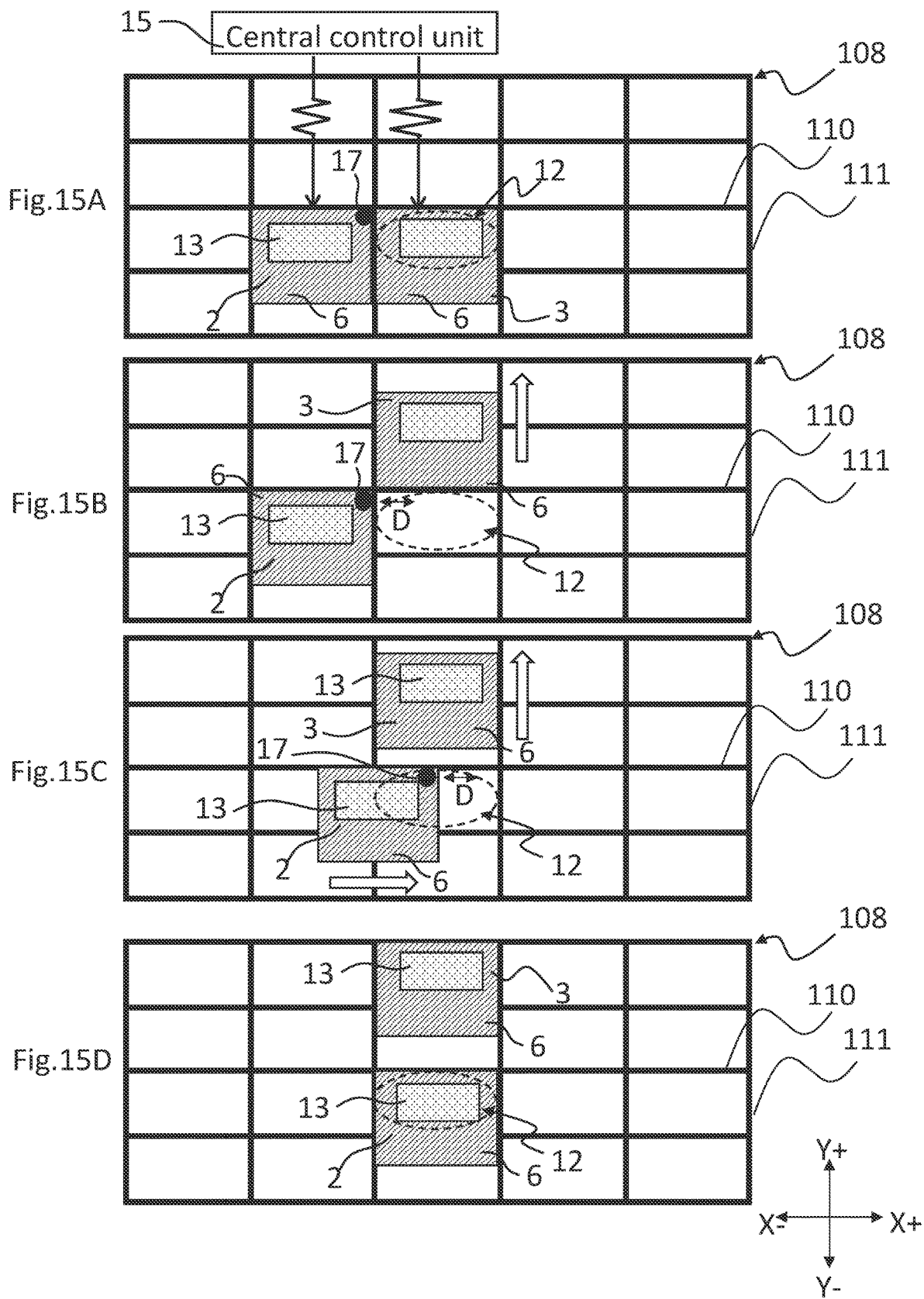

METHOD OF OPERATING AN AUTOMATED STORAGE AND RETRIEVAL SYSTEM

TECHNICAL FIELD

The present invention relates to a method of operating an automated storage and retrieval system, and an automated storage and retrieval system.

BACKGROUND AND PRIOR ART

FIG. 1 discloses a typical prior art automated storage and retrieval system 1 with a framework structure 100 and FIGS. 2a and 2b disclose prior art container handling vehicles 101, 201 of such a system 1.

The framework structure 100 comprises a plurality of upright members 102 and a plurality of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. Each storage container 106 may typically hold a plurality of product items (not shown), and the product items within a storage container 106 may be identical, or may be of different product types depending on the application. The storage grid 104 guards against horizontal movement of the containers in the stacks 107, and guides vertical movement of the containers 106, but does normally not otherwise support the storage containers 106 when stacked.

Some of the horizontal members 103 comprise a rail system 108 arranged in a grid pattern across the top of the storage columns 105, on which rail system 108 a plurality of container handling vehicles 101 are operated to raise storage containers 106 from—and lower storage containers 106 into—the storage columns 105, and also to transport the storage containers 106 above the storage columns 105. The rail system 108 comprises a first set of parallel rails 110 arranged to guide movement of the container handling vehicles 101 in a first direction X across the top of the frame structure 100, and a second set of parallel rails 111 arranged perpendicularly to the first set of rails 110 to guide movement of the container handling vehicles 101 in a second direction Y, which is perpendicular to the first direction X. In this way, the rail system 108 defines grid columns 112 above which the container handling vehicles 101 can move laterally above the storage columns 105, i.e. in a plane which is parallel to the horizontal X-Y plane.

Each container handling vehicle 101 comprises a vehicle body 101a, and first and second sets of wheels 101b, 101c which enable the lateral movement of the container handling vehicle 101 in the X direction and in the Y direction, respectively. In FIG. 2a two wheels in each set are visible. The first set of wheels 101b is arranged to engage with two adjacent rails of the first set of rails 110, and the second set of wheels 101c is arranged to engage with two adjacent rails of the second set of rails 111. Each set of wheels 101b, 101c can be lifted and lowered, so that the first set of wheels 101b and/or the second set of wheels 101c can be engaged with the respective set of rails 110, 111 at any one time.

Each container handling vehicle 101 also comprises a lifting device snot shown in FIG. 2a) for vertical transportation of storage containers 106, e.g. raising a storage container 106 from, and lowering a storage container 106 into, a storage column 105. The lifting device comprises a gripping device (not shown) which is adapted to engage a storage container 106, and which gripping device can be lowered from the vehicle body 101a so that the position of the gripping device with respect to the vehicle body 101a can be adjusted in a third direction Z which is orthogonal the first direction X and the second direction Y.

Conventionally, and also for the purpose of this application, Z=1 identifies the uppermost storage layer of the grid 104, i.e. the layer immediately below the rail system 108, Z=2 the second layer below the rail system 108, Z=3 the third layer etc.

In the exemplary prior art grid disclosed in FIG. 1, Z=8 identifies the lowermost, bottom layer of the grid 104. Similarly, X=1 identifies the first row of columns in the X direction from the corner chosen as the origin, and Y=1 identifies the first row of columns in the Y direction from the corner chosen as the origin. Consequently, as an example, and using the Cartesian coordinate system X, Y, Z indicated in Fig. 1, the storage container identified as 106' in FIG. 1 can be said to occupy grid location or cell X=10, Y=2, Z=3. The container handling vehicles 101 can be said to travel in layer Z=0 and each grid column 112 can be identified by its X and Y coordinates, Each container handling vehicle 101 comprises a storage compartment or space for receiving and stowing a storage container 106 when transporting the storage container 106 across the rail system 108. The storage space may comprise a cavity arranged centrally within the vehicle body 101a, e.g. as is described in WO2014/090684A1, the contents of which are incorporated herein by reference.

Alternatively, the container handling vehicles 201 may have a cantilever construction as illustrated in FIG. 2b and is described in NO317366, the contents of which are also incorporated herein by reference.

The container handling vehicles 101 may have a footprint (i.e. a footprint that covers an area with dimensions in the X and Y directions), which is generally equal to the area defined by the lateral extension in the X and Y directions of a grid column 112, e.g. as is described in WO2015/193278A1, the contents of which are incorporated herein by reference. The term "lateral" used herein may mean "horizontal".

Alternatively, the container handling vehicles 101 may have a footprint which is larger than the lateral area defined a grid column 112, e.g. as is disclosed in WO2014/090684A1.

The rail system 108 may be a single track system, as is shown in FIG. 3, Alternatively, the rail system 108 may be a double track system, as is shown in FIG. 4, thus allowing a container handling vehicle 101 having a footprint generally corresponding to the lateral area defined by a grid column 112 to travel along a row of grid columns even if another container handling vehicle 101 is positioned above a grid column neighboring that row. Both the single and double track systems, or systems using a combination of single and double tracks, form a grid pattern in the horizontal plane P comprising a plurality of rectangular and uniform grid locations or grid cells 122, where each grid cell 122 comprises a grid opening 115 being delimited by a pair of rails 110a, 110b of the first set of rails 110 and a pair of rails 111a, 111b of the second set of rails 111. In FIG. 4 the grid cell 122 is indicated by a dashed box.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122.

In a storage grid 104, a majority of the grid columns 112 are storage columns 105, i.e. grid columns 105 wherein storage containers 106 are stored in stacks 107. However, a grid 104 normally has at least one grid column 112 which is used not for storing storage containers 106, but which comprises a location where the container handling vehicles 101 can drop off and/or pick up storage containers 106 so that they can be transported to an access station (not illustrated herein) where the storage containers 106 can be accessed from outside of the grid 104 or transferred out of or into the grid 104. Within the art, such a location is normally referred to as a "port" and the grid column 112 in which the port is located may be referred to as a "port column" 19, 20.

The grid 104 in FIG. 1 comprises two port columns 19 and 20. The first port column 19 may for example be a dedicated drop-off port column where the container handling vehicles 101 can drop off storage containers to be transported to an access or a transfer station and the second port column 20 may be a dedicated pick-up port column where the container handling vehicles 101 can pick up storage containers 106 that have been transported to the grid 104 from an access or a transfer station The access station may typically be a picking or a stocking station where product items are removed from or positioned into the storage containers 106. In a picking or a stocking station the storage containers 106 are normally never removed from the automated storage and retrieval system 1, but are returned into the grid 104 once accessed. A port can also be used for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 19, 20 and the access station If the port and the access station are located at different levels, the conveyor system may comprise a lift device for transporting the storage containers 106 vertically between the port 19, 20 and the access station The conveyor system may be arranged to transfer storage containers 106 between different grids, e.g. as is described in WO2014/075937A1, the contents of which are incorporated herein by reference.

WO2016/198467A1, the contents of which are incorporated herein by reference, discloses an example of a prior art access system having conveyor belts (FIGS. 5a and 5b therein) and a frame mounted track (FIGS. 6a and 6b therein) for transporting storage containers between ports and work stations where operators can access the storage containers.

When a storage container 106 stored in the grid 104 disclosed in FIG. 1 is to be accessed, one of the container handling vehicles 101 is instructed to retrieve the target storage container 106 from its position in the grid 104 and transport it to the drop-off port 19. This operation involves moving the container handling vehicle 101 to a grid location above the storage column 105 in which the target storage container 106 is positioned, retrieving the storage container 106 from the storage column 105 using the container handling vehicle's 101 lifting device (not shown), and transporting the storage container 106 to the drop-off port 19. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 19, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 101 is instructed to pick up the storage container 106 from the pick-up port 20 and transport it to a grid location above the storage column 105 where it is to be stored. After any storage containers positioned at or above the target position within the storage column stack 107 have been removed, the container handling vehicle 101 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the grid 104; the content of each storage container 106; and the movement and traffic flow of the container handling vehicles 101 so that a desired storage container 106 can be delivered to the desired location at the desired time without the container handling vehicles 101 colliding with each other, the automated storage and retrieval system 1 comprises a central control system which typically is computerized and which typically comprises a database for keeping track of the storage containers 106.

The container handling vehicles comprise a vehicle control unit which is signally connected to the central control system for transmittal and receival of data signals. The vehicle control unit is connected to the driving means of the vehicle, the lifting means and any sensors on the vehicle, and may relay and/or process data signals between components of the vehicle and the central control system. For example, as is known from prior art document WO2018082972, sensors on the container handling vehicle arranged near the track measure whenever a track crossing has been passed, and thus the vehicle control unit can keep track of its position on the grid which may further be relayed to a central control system.

A problem associated with known traffic flow management is that the area surrounding certain cells, such as ports 19, 20 or other columns frequently visited by container handling vehicles, may become congested with the container handling vehicles 101 instructed to drop off or pick up storage containers 106. As one container handling vehicle 101 is blocking access to a target cell 12, which may be e.g. one of the grid cells 122 or one of the ports 19,20, another container handling vehicle 101 may start queuing up on an adjacent cell awaiting access to the target cell 12. Once the container handling vehicle 101 blocking access to the target cell 12 has moved away from its blocking position, it is desirable to move the queuing container handling vehicle into the target cell 12 as quickly as possible.

A problem with the prior art is that the position of a container handling vehicle is not known with certainty until it has passed a track crossing. The position of the container handling vehicle may then be transmitted to the central control system which processes this information to establish whether a queuing container handling vehicle can move into the target cell 12. This results in a delay due to the command being relayed through, and processed in, the central control system. Moreover, delays will occur in situations where access to the target cell 12 is free, but the formerly blocking container handling vehicle has not yet established and transmitted its new position. Furthermore, the relaying of this information takes up limited capacity on the communications bandwidth between the container handling vehicles 101 and the control system.

In view of the above, it is desirable to provide an automated storage and retrieval system, and a method for operating such a system, that solves or at least mitigates one or more of the aforementioned problems related to use of prior art storage and retrieval systems.

SUMMARY OF THE INVENTION

The present invention is set forth and characterized in the main claims, while the dependent claims describe optional features of the invention.

Accordingly, the present invention relates in an aspect to a method of operating an automated storage and retrieval system, the automated storage and retrieval system comprising:
- a rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent grid cells,
- a central control unit configured to receive, transmit and process data signals of a plurality of container handling vehicles for handling storage containers of the automated storage and retrieval system,
- each container handling vehicle comprising
- a vehicle body
- a wheel assembly provided on the vehicle body, the wheel assembly being configured to move the vehicle along the rail system in both of the first direction and the second direction,
- a vehicle control unit configured to receive data signals from, transmit data signals to and process data signals of the central control unit, and
- a proximity sensor system configured to detect another container handling vehicle of said plurality of container handling vehicles and determine whether or not it is within a predetermined distance,
wherein the method comprises:
detecting with the central control unit that access of a first container handling vehicle to a target cell, which is one of the plurality of grid cells, is blocked by a second container handling vehicle,
transmitting a data signal from the central control unit to the vehicle control unit of the first container handling vehicle commanding the first container handling vehicle to move into the target cell when the second container handling vehicle is beyond said predetermined distance.

Thus, the invention allows for more efficient and faster queuing of container handling vehicles accessing a target cell, as the first container handling vehicle does not have to wait for the second handling vehicle to transmit its new cell position to the central control unit, and/or for the central control unit to process this information and then command the first container handling vehicle to move into the target cell. The invention may be especially advantageous where container handling vehicles are operating on a rail system in the vicinity of port columns, and where container handling vehicles comprising container delivery vehicles are operating on a rail system for delivery of storage containers to be picked at an access point. The invention may be especially advantageous where the target cell is free, or it is considered acceptable for the first container handling vehicle to start moving into the target cell, but it would not move in the prior art as it requires a command to do so from the central control unit. The invention may therefore allow the first container handling vehicle to start moving towards the target cell whilst the second container handling vehicle is still partially within the target cell. The invention may also provide a more efficient use of bandwidth in the automated storage system, as unnecessary signals back and forth between the central control unit and the container handling vehicles are reduced. The processing power of the central control unit may also be used more efficiently as the first container handling vehicle does not require a separate command to move into the target cell when the control unit has computed that it is free, as is necessary in the prior art.

Transmitting a data signal from the central control unit to the vehicle control unit of the first container handling vehicle may comprise commanding the first container handling vehicle not to move into the target cell when the second container handling vehicle is within said predetermined distance. Thus, the first container handling vehicle may move if and only if the second container handling vehicle is distant enough.

The proximity sensor system may be configured to detect when another container handling vehicle is within a predetermined distance, i.e. by a Boolean value where the first container handling vehicle moves when the other container handling vehicle's distance is greater than the given value for the predetermined distance. The proximity sensor system may also be configured to detect another container handling vehicle when it is within a predetermined distance, i.e. the proximity sensor system does detect anything beyond said distance. The first container handling vehicle will thus only move if the proximity sensor system detects that the second vehicle is beyond the predetermined distance. To achieve redundancy in case of a failure to detect another container handling vehicle within the predetermined distance, the second container handling vehicle may have redundancy measures such as transmitting a signal that it has moved clear of blocking the target cell to the central control unit as is known in the prior art. Also, the first container handling vehicle may transmit that it has arrived at the target cell to the central control unit as is known in the prior art.

The proximity sensor system may typically be capable of measuring a target up to a given distance of e.g. 2 meters, as this may be length of a grid cell. However, the predetermined distance may be calculated and set by the central control unit according to the requirements and specification of the automated storage system, such as the size and travelling speed of the container handling vehicle and the size of the grid cells which may be dependent on the direction of travel of a container handling vehicle. Each vehicle control unit may also be able to calculate the predetermined distance based on parameters such as the size and travelling speed of the container handling vehicle and which direction it is travelling in. The predetermined distance may also be provided in the data signal sent from the central control system, such that the distance may vary depending on what the central control system has computed to be suitable. For example the predetermined distance may be shortened in periods of heavy traffic. The predetermined distance may be smaller than the size of a grid cell in either of the two perpendicular directions. A target cell may be a cell which is frequently visited by container handling vehicles and therefore experiences a substantial amount of traffic, for example a grid cell located over a port column. However, the invention is not limited to port cells and may provide improved traffic handling for all kinds of cells, such as cells located over storage columns. The container handling vehicle may comprise container delivery vehicles, and accordingly a target cell may be located beneath a port column of the grid or at an access point, typically at the edge of the rail system, where the container delivery vehicle is to deliver a storage container to be picked.

Typically, the second handling vehicle may block access to a target cell when it at least partially covers said target cell. However, the second handling vehicle may for example also block access to a target cell in cases where it occupies an adjacent cell to the target cell, and the first handling vehicle has an extent which is larger than the lateral area defined by a grid column. Thus, the term moving clear does not necessarily imply that the second container handling vehicle is above or covering the target cell, but rather that it obstructs a first container handling vehicle from entering the target given the movement constraints of the rail system.

The invention may thus be advantageous where container delivery vehicles operate on a rail system, as these rails systems can become heavily trafficked. The target cell may be defined as a. cell to which the first container handling vehicle has received a command to move to. A plurality of container handling vehicles may form queues, which may be typical around port cells. In such cases the invention may provide a more efficient and smooth movement of the container handling vehicles as access to the port cell is freed up and the first container handling vehicle in the queue moves in to the cell, whilst the other vehicles follow closely by the method disclosed herein, which allows them to move towards a target cell whilst another vehicle is still partially in the target cell.

The vehicle control system of the first container handling vehicle may derive which parts of the proximity sensor system require activation based on the command it receives from the central control system, which typically may be the part of the proximity sensor system arranged to measure in the direction in which the first container handling vehicle is commanded to drive to reach the target cell. In other aspects, the central control system may include instructions in the data signal as to which parts of the proximity sensor system is to be activated. The vehicle control system may further receive instructions in the data signal regarding the duration of activation for the proximity sensor system, which may depend on whether the first container handling vehicle is following the second container handling vehicle in a parallel direction, or the second container handling vehicle moves in an orthogonal direction. It may for example be advantageous to keep the proximity sensor system activated when the first container handling vehicle follows the second container handling vehicle to avoid collisions.

In aspects, the predetermined distance may be measured from a side surface of the first container handling vehicle in a direction of the tracks. Preferably, said side surface may form part of a vertical plane parallel to a direction of one of the sets of tracks and tangent to the an outermost lateral blocking extension in the X and Y directions of a container handling vehicle. Where the outermost lateral blocking extension may be defined as a physical part of a container handling vehicle which would limit another container handling vehicle to pass by the first container handling vehicle in an adjacent cell. Elastic antennas, brushes and other deformable objects not posing a physical barrier may therefore not be regarded as forming an outermost extension. It should however be noted that a container handling vehicle may comprise a lateral extension which does not constitute a lateral blocking section, for example container handling vehicles with a protruding section on one side may also comprise a complementary recessed section on an opposite side, or the protruding section may be arranged to extend above other container handling vehicles on the grid.

By defining a side surface as described above, the proximity sensor system may thus advantageously be arranged at different locations on the container handling vehicle with varying distance to a side surface, which may depend on the construction of the container handling vehicle and its outermost lateral blocking extensions.

In aspects, each container handling vehicle may comprise four side surfaces comprising:
  a first side surface facing a positive first direction, a second side surface facing a negative first direction, a third side surface facing a positive second direction and a fourth side surface facing a negative second direction, wherein the positive and negative directions are opposite of each other;
  and where the first side surface and the second side surface extend between the third side surface and the fourth side surface such that the side surfaces form a rectangular zone onto the horizontal plane of the track system.

The rectangular zone of a container handling vehicle on the track system may thus define the area on the grid which a container handling vehicle takes up or the area which the vehicle obstructs other vehicles from entering, and where other container handling vehicles cannot pass by, and thus provide the central control system with an overview of whether it occupies a grid column or not. Each side surfaces may also define the lateral extent where the proximity sensor system is required to measure.

The method may comprise transmitting a data signal from the central control unit to the vehicle control unit of the second container handling vehicle commanding the second container handling vehicle to move clear of the target cell. The data signal to the second container handling vehicle may be transmitted before or after the data signal to the first container handling vehicle is transmitted. For example the data signal to the second container handling vehicle may have been transmitted before, but the second container handling vehicle is busy operating at its current location, and has therefore not yet moved when the first container handling vehicle arrives and is blocked from accessing the target cell.

The method may comprise transmitting a data signal from the central control unit to the vehicle control unit of the second container handling vehicle commanding the second load handling vehicle to move clear of the target cell and to another location of the rail system. The data signal commanding the second container handling vehicle to move clear of the target cell may be a normal command with a new task of for example retrieving or depositing a container at another location in the grid.

The method may comprise transmitting a data signal from the central control unit to the vehicle control unit of the second container handling vehicle commanding the second container handling vehicle to move in a direction parallel to the direction between the target cell and the first container handling vehicle. Thus, the first container handling vehicle and the second container handling vehicle may move in a parallel or the same direction.

The method may comprise continuously monitoring with the proximity sensor system of the first container handling vehicle as it moves into the target cell to detect if the second container handling vehicle is within a predetermined distance. Thus, the first container handling vehicle may monitor whether the second container handling vehicle unexpectedly stops, such that it may itself stop moving and avoid a collision. Continuous monitoring may thus be advantageous when the container handling vehicles move in the same or a parallel direction. The data signal transmitted to the first container handling vehicle may thus command it to continuously monitor the predetermined distance in its direction of travel.

When the container handling vehicles move in a parallel direction, the predetermined distance may be set to slightly above the length or width of a grid cell in the direction of travel. For example between 30 and 200 centimeters, or between 50 and 200 centimeters depending on the direction of travel. However, the predetermined distance may vary depending on the speed of the container handling vehicles. The predetermined distance may also be set to slightly below the length or width of a grid cell in the direction of travel, this may be advantageous e.g. during periods of heavy traffic and where queues of multiple container handling vehicles line up. However, the distance between the side surfaces of the first container handling vehicle and the second container handling vehicle, once the first container handling vehicle is located on the grid cell adjacent the target cell, may also be taken into account.

The method may comprise transmitting a data signal from the central control unit to the vehicle control unit of the second container handling vehicle commanding the second container handling vehicle to move in a direction orthogonal to the direction between the target cell and the first container handling device.

Typically, when the container handling vehicles move in an orthogonal direction to each other, the predetermined distance may be set to slightly above the width of the rails, i.e. between 1-20 centimeters. The data signal transmitted to the first container handling vehicle may also command it to only monitor the predetermined distance until the second container handling vehicle is no longer within the predetermined distance. The data signal may also comprise details regarding the direction of travel of the second container handling vehicle, such that the vehicle control unit of the first container handling vehicle may decide which parts of the proximity sensor system needs to monitor the predetermined distance. However, the distance between the side surfaces of the first container handling vehicle and the second container handling vehicle, once the first container handling vehicle is located on the grid cell adjacent the target cell, may also be taken into account.

The proximity sensor system of the first container handling vehicle may measure the predetermined distance from a side surface of a plurality of side surfaces of the first container handling vehicle and wherein the predetermined distance is defined in a direction of the rails. Preferably, said side surface may form part of a vertical plane perpendicular to the plane defined by both of the rails and parallel to a direction of one of the sets of rails, and tangent to an outermost lateral blocking extension in the X and Y directions of a container handling vehicle, where the outermost lateral blocking extension may be defined as a physical part of a container handling vehicle which would limit another container handling vehicle to pass by the first container handling vehicle in an adjacent cell. Elastic antennas, brushes and other deformable objects not posing a physical barrier may therefore not be regarded as forming an outermost extension. It should however be noted that a container handling vehicle may comprise a lateral extension which does not constitute a lateral blocking section, for example container handling vehicles with a protruding section on one side may also comprise a complementary recessed section on an opposite side, or the protruding section may be arranged to extend above other container handling vehicles on the grid.

By defining a side surface as described above, the proximity sensor system may thus advantageously be arranged at different locations on the container handling vehicle with varying distance to a side surface, which may depend on the construction of the container handling vehicle and its outermost lateral blocking extensions.

The method may comprise determining with the vehicle control unit from which side surface of the first container handling vehicles to detect the second container handling vehicle. Typically, the first container handling vehicle may monitor in its direction of intended travel. The central control unit may further provide the direction of travel of the second container handling vehicle such that the vehicle control unit can determine with which parts of the proximity sensor system to monitor.

The method may comprise transmitting a data signal from the central control unit to the vehicle control unit of the first container handling vehicle to specify the predetermined distance.

In an aspect, the invention relates to an automated storage and retrieval system comprising:
  a rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent grid cells;
  a central control unit configured to receive, transmit and process data signals of a plurality of container handling vehicles for handling storage containers of the automated storage and retrieval system,
  each container handling vehicle comprising
  a vehicle body
  a wheel assembly provided on the vehicle body, the wheel assembly being configured to move the vehicle along the rail system in at least one of the first direction and the second direction,
  a vehicle control unit configured to receive, transmit and process data signals of the central control unit;
  each of said plurality of container handling vehicles comprises a proximity sensor system configured to detect another container handling vehicle of said plurality of container handling vehicles and determine whether or not it is within a predetermined distance, characterized in that the central control unit is configured to:
  detect that access of a first container handling vehicle to a target cell, which is one of the plurality of grid cells, is blocked by a second container handling vehicle,
  transmit a data signal from the central control unit to the vehicle control unit of the first container handling vehicle commanding the first container handling vehicle to move into the target cell when the second container handling vehicle is beyond said predetermined distance.

Alternatively, not all container handling vehicles of an automated storage and retrieval system may comprise proximity sensors. It may be conceivable that only a portion of the plurality of container handling vehicles comprise proximity sensors. This may be because only a certain portion of the container handling vehicles are required to operate in heavily trafficked areas, or it could be because a portion of the plurality of container handling vehicles belong to a generation of vehicles of the prior art which did not require proximity sensors and not all vehicles have been replaced.

The predetermined distance may be measured from a side surface of a container handling vehicle in a direction of the rails.

Each container handling vehicle may comprise four vertical side surfaces:
  a first side surface facing a positive first direction, a second side surface facing a negative first direction, a third side surface facing a positive second direction and a fourth side surface facing a negative second direction wherein the positive and negative directions are opposite of each other;
  and where the first side surface and the second side surface extend between the third side surface and the fourth side surface and such that the side surfaces form a rectangular cross section in a horizontal plane.

The rectangular cross section of a container handling vehicle on the track system may thus define the area on the grid which a container handling vehicle takes up, or the area which the vehicle obstructs other vehicles from entering given the movement constraints of the rail system, and where other container handling vehicles cannot pass by. The rectangular cross section thus provides the central control system with an overview of whether it occupies a grid cell or not. Each side surfaces may also define the lateral extent where the proximity sensor system is required to measure.

The proximity sensor system may comprise at least any of:
  a first part sensor system directed outwards from the first side surface in the positive first direction and being capable of detecting another container handling vehicle within said predetermined distance from the first side surface, and
  a second part sensor system directed outwards from the second side surface in the negative first direction and being capable of detecting another container handling vehicle within said predetermined distance from the second side surface, and
  a third part sensor system directed outwards from the third side surface in the positive second direction and being capable of detecting another container handling vehicle within said predetermined distance from the third side surface, and
  a fourth part sensor system directed outwards from the fourth side surface in the negative second direction and being capable of detecting another container handling vehicle within said predetermined distance from the fourth side surface.

Thus, a container handling vehicle may comprise only one, two, three or four part sensor systems. In some storage systems, it may be apparent that a container handling vehicle only requires one part sensor system in a certain direction and therefore it may be cheaper to provide container handling vehicles with a minimal number of sensor systems. Likewise, some systems may only require container handling vehicles to comprise sensor systems in two or three directions, and the number of part sensor systems are accordingly provided.

The proximity sensor system may comprise at least two proximity sensors, wherein each of the at least two proximity sensors are arranged to detect another container handling vehicle at the boundaries of any of the side surfaces in the horizontal plane. Thus, the at least two proximity sensors of first container handling vehicle may detect when a second container handling vehicle has moved away from a blocking position in a direction orthogonal to the direction of which the first container handling vehicle has been commanded to move.

The proximity sensors may be of any kind which are known in the art, for example optical, radar, acoustic, magnetic, capacitive or a combination of these.

In other configurations, only one proximity sensor may be arranged per part sensor system, yet the one proximity sensor may be arranged such that it can detect along part of or the entire side surface, for example one sensor may be arranged which extends along an entire side surface. In some configurations, one proximity sensor may be arranged at a corner of two side surfaces and arranged to detect another container handling vehicle directed outward from at least one of the two side surfaces, in which case the proximity sensor may be regarded as part of both proximity sensor systems of the two sides, i.e. two part sensor systems share one common proximity sensor.

The rectangular cross section of any of the first or second container handling vehicles may correspond to an integer of grid cells. For example, both container handling vehicles may have a rectangular cross section corresponding to only one grid cell, in which case the second container handling vehicle may only block access to a target cell when it at least partially covers a target cell. In other examples, any of the container handling vehicles may have a rectangular cross section corresponding to an integer multiple of grid cells. For example, the first container handling vehicle may have a rectangular cross section corresponding to two whole grid cells, and the second container handling vehicle may have a rectangular cross section corresponding to only one grid cell. In this example, the second container handling vehicle may block access to the target cell even if it only partially covers a cell adjacent to the target cell.

The rectangular cross section of any of the first or second container handling vehicles may correspond to more than one grid cell. For example, the first container handling vehicle may have a rectangular cross section corresponding to only one grid cells, and the second container handling vehicle may have a rectangular cross section corresponding to one by one and a half grid cells.

As will be apparent to the person skilled in the art based on the disclosure of the invention herein, the system according to any of the aforementioned aspects may be configured to perform the method according to any of the aforementioned aspects.

In the following, numerous specific details are introduced by way of example only to provide a thorough understanding of embodiments of the claimed, method of operating an automated storage and retrieval system and an automated storage and retrieval system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

Following drawings are appended by way of example only to facilitate the understanding of the invention.

FIG. 12a through 12d are each a schematic top view of a rail system, illustrating steps of a method where the container handling vehicles move in the same direction.

FIG. 13a through 13d are each a schematic top view of a rail system, illustrating steps of a method similar to FIG. 12 but where the second container handling vehicle occupies a cell adjacent to a target cell.

FIG. 14a through 14d are each a schematic top view of a rail system, illustrating steps of a method similar to FIG. 12 but where the second container handling vehicle partially occupies a target cell.

FIGS. 15a through 15d are each a schematic top view of a rail system, illustrating the steps of a method where the container handling vehicles move in an orthogonal direction to each other.

In the drawings, like reference numerals have been used to indicate like parts, elements or features unless otherwise explicitly stated or implicitly understood from the context.

DETAILED DESCRIPTION OF THE INVENTION

Figure 1:
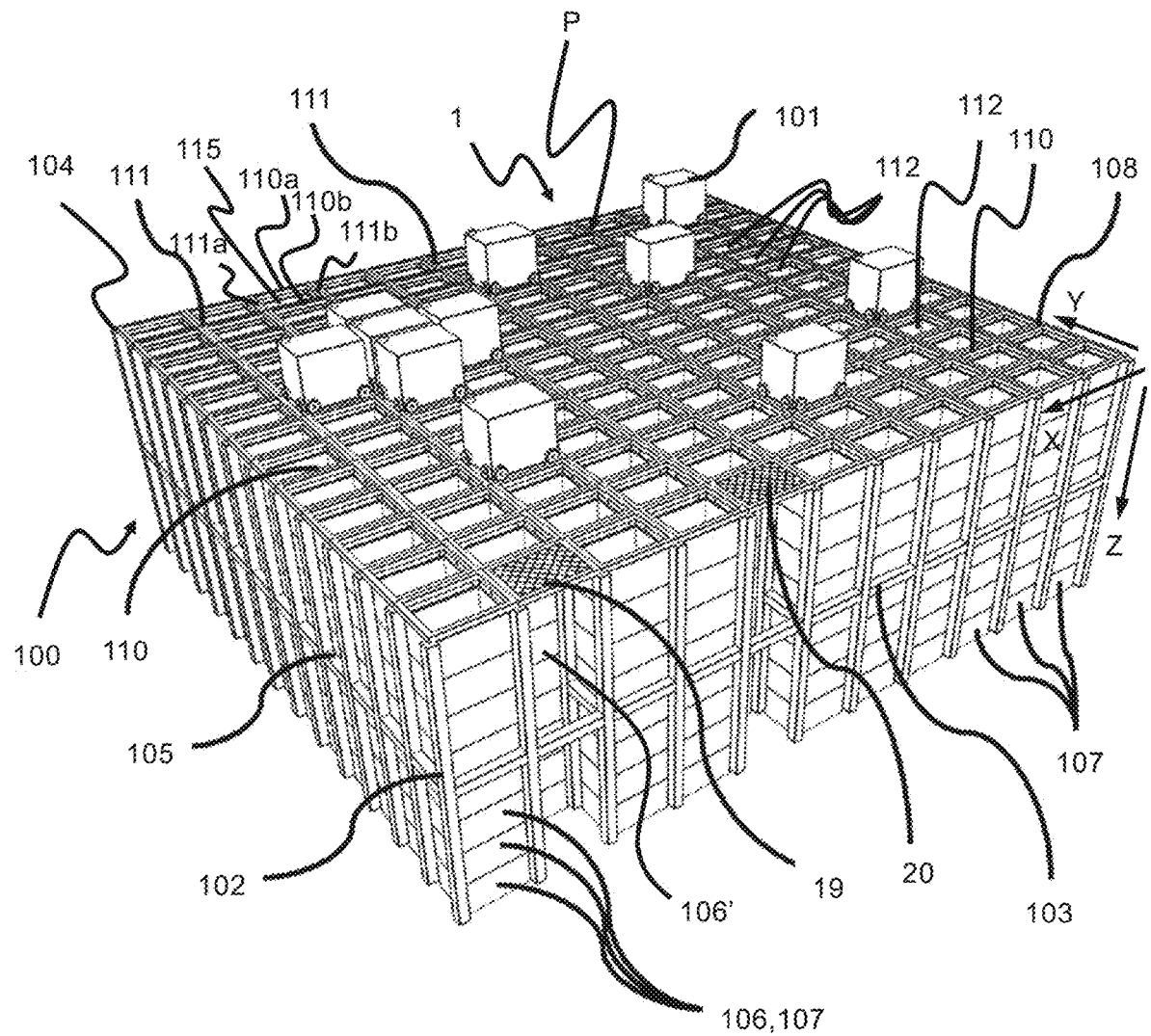
FIG. 1 is a perspective view of a grid of a prior art automated storage and retrieval system.

In the following, embodiments of the invention will be discussed in more detail by way of example only and with reference to the appended drawings. It should be understood, however, that the drawings are not intended to limit the invention to the subject-matter depicted in the drawings.

Figure 3:
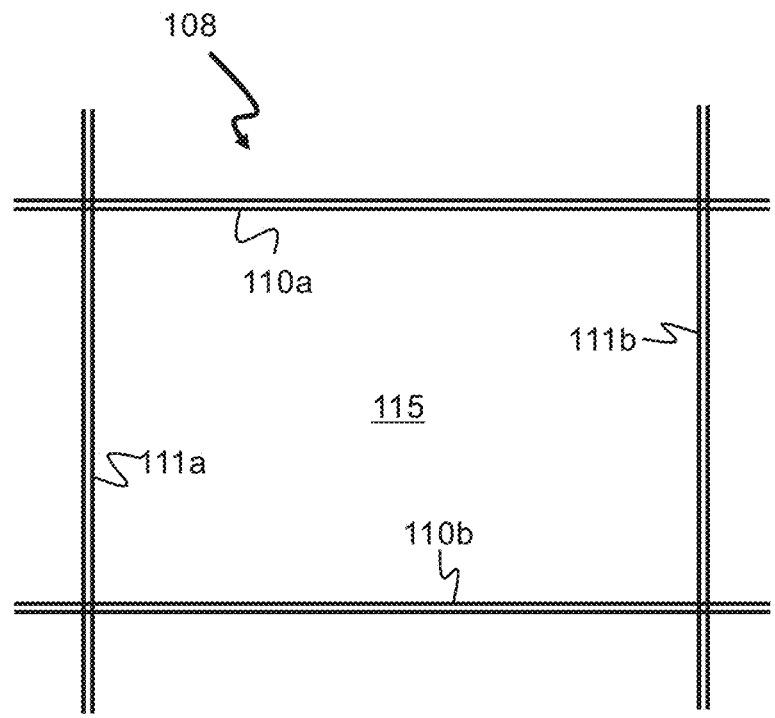
FIG. 3 is a top view of a prior art single rail grid.
Figure 4:
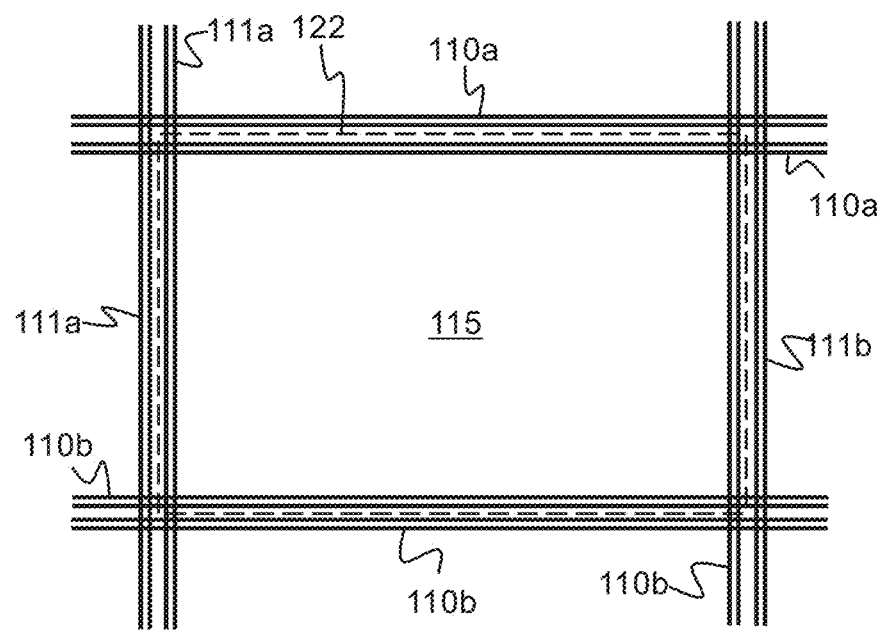
FIG. 4 is a top view of a prior art double rail grid.

The framework 100 of the automated storage and retrieval system 1 is constructed in accordance with the prior art framework 100 described above in connection with FIGS. 1-4, i.e. a number of upright members 102 and a number of horizontal members 103, which are supported by the upright members 102, and further that the framework 100 comprises a rail system 108 of parallel rails 110,111 in X direction and Y direction arranged across the top of storage columns 105/grid columns 112. The horizontal area of a grid column 112. i.e. the area along the X and Y directions, may be defined by the distance between adjacent rails 110 and 111, respectively (see FIGS. 3 and 4).

In FIG. 1 the grid 104 is shown with a height of eight cells. It is understood, however, that the grid 104 in principle can be of any size. In particular it is understood that grid 104 can be considerably wider and/or longer and/or deeper than disclosed in FIG. 1. For example, the grid 104 may have a horizontal extent of more than 700×700 grid cells and a depth of more than twelve grid cells.

Figure 5:
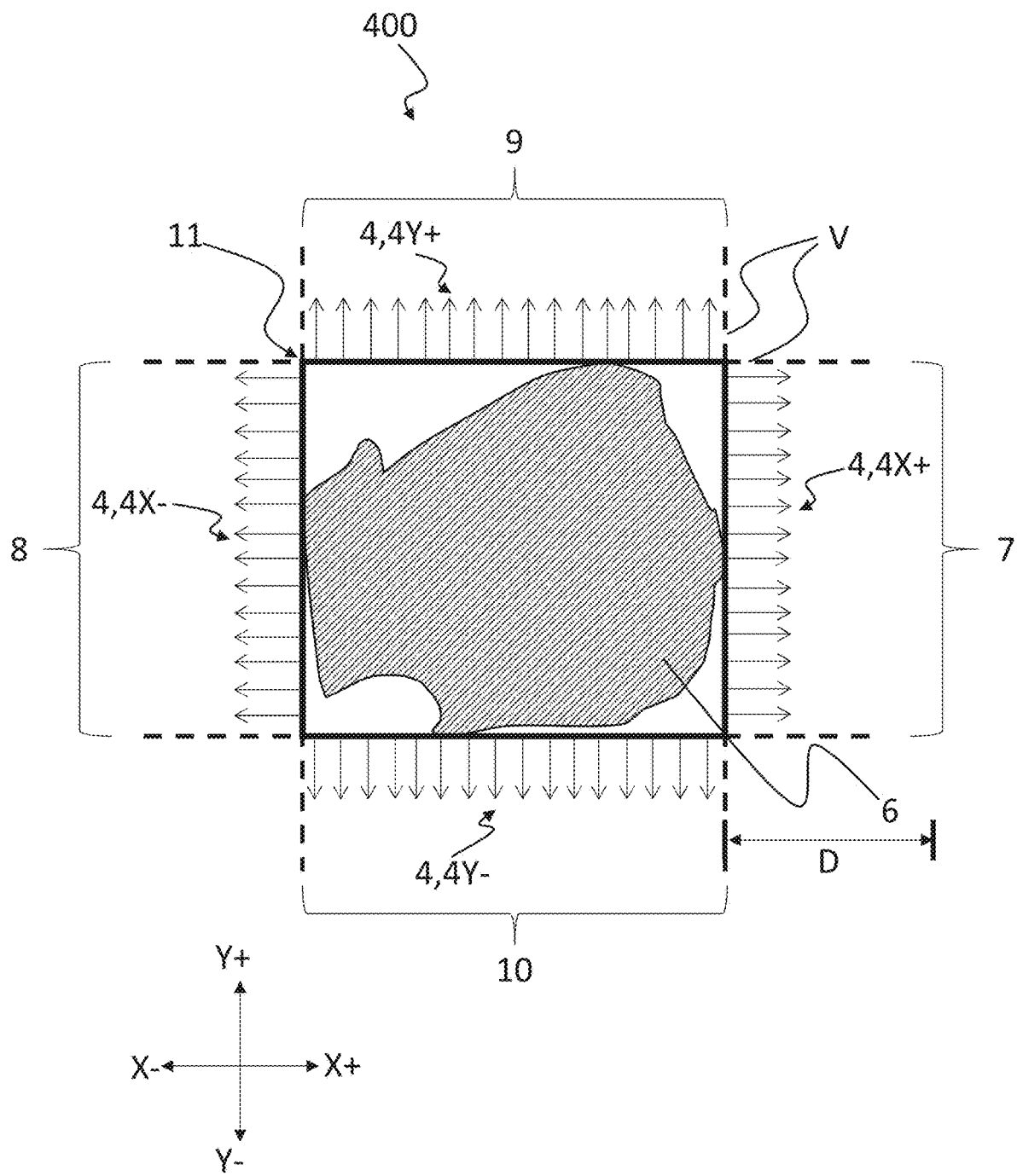
FIG. 5 is a schematic illustration of the four vertical side surfaces formed by a container handling vehicle with an irregular projection on the horizontal plane of the rail system.

The grey area of FIG. 5 illustrates the projection 6 onto a horizontal plane of an irregularly shaped container handling vehicle 400 and the side surfaces 7,8,9,10 parallel to the first direction X and the second direction Y, on the tangent of the projection 6, thereby forming a rectangular cross section 11 represented by the full line. Accordingly, a first side surface 7 and a second side surface 8 are parallel to a vertical plane V, illustrated by a dashed line, which is also parallel to the second direction Y, whilst a third side surface 9 and a fourth side surface 10 are parallel to vertical plane V, illustrated by another dashed line orthogonal to the one previously mentioned, which is also parallel to the first direction X. The projection 6 illustrates the outermost lateral blocking extent of the container handling vehicle in the first direction X and second direction Y, i.e. the outermost points of the container handling vehicle where another vehicle cannot pass by. As illustrated by the example along the first positive direction X+, the predetermined distance D is measured from the first side surface 7 independent of the shape of the container handling vehicle. As a proximity sensor system 4 on the container handling vehicle illustrated FIG. 5 cannot physically be arranged along the first side surface 7, the distance from a sensor in the proximity sensor system 4 to the side surface 7 needs to be accounted for.

As shown in FIG. 5 the proximity sensor system 4 is arranged to detect along an entire side surface 7,8,9,10. The first side surface 7 thus faces a positive first direction X+, a second side surface 8 faces a negative first direction X−, a third side surface 9 faces a positive second direction Y+ and a fourth side surface 10 facing a negative second direction Y−. The negative directions are oriented oppositely to their respective positive directions. The side surfaces 7,8,9,10 combined form a rectangular cross section 11 in the horizontal plane P such that the first side surface 7 and the second side surface 8 extend between the third side surface 9 and the fourth side surface 10 and vice versa.

As illustrated in FIG. 5. the directions of detection of the proximity sensor system 4 are represented by the arrows pointing out from the side surfaces 7,8,9,10. Thus, a first part sensor system 4X+ is arranged to detect along the first side surface 7 in a positive first direction X+, a second part sensor system 4X– is arranged to detect along the second side surface 8 in a negative first direction X–, a third part sensor system 4Y+ is arranged to detect along a third side surface 9 in a positive second direction Y+ and a fourth part sensor system 4Y is arranged to detect along the fourth side surface 10 in a negative second direction Y–.

Figure 6:
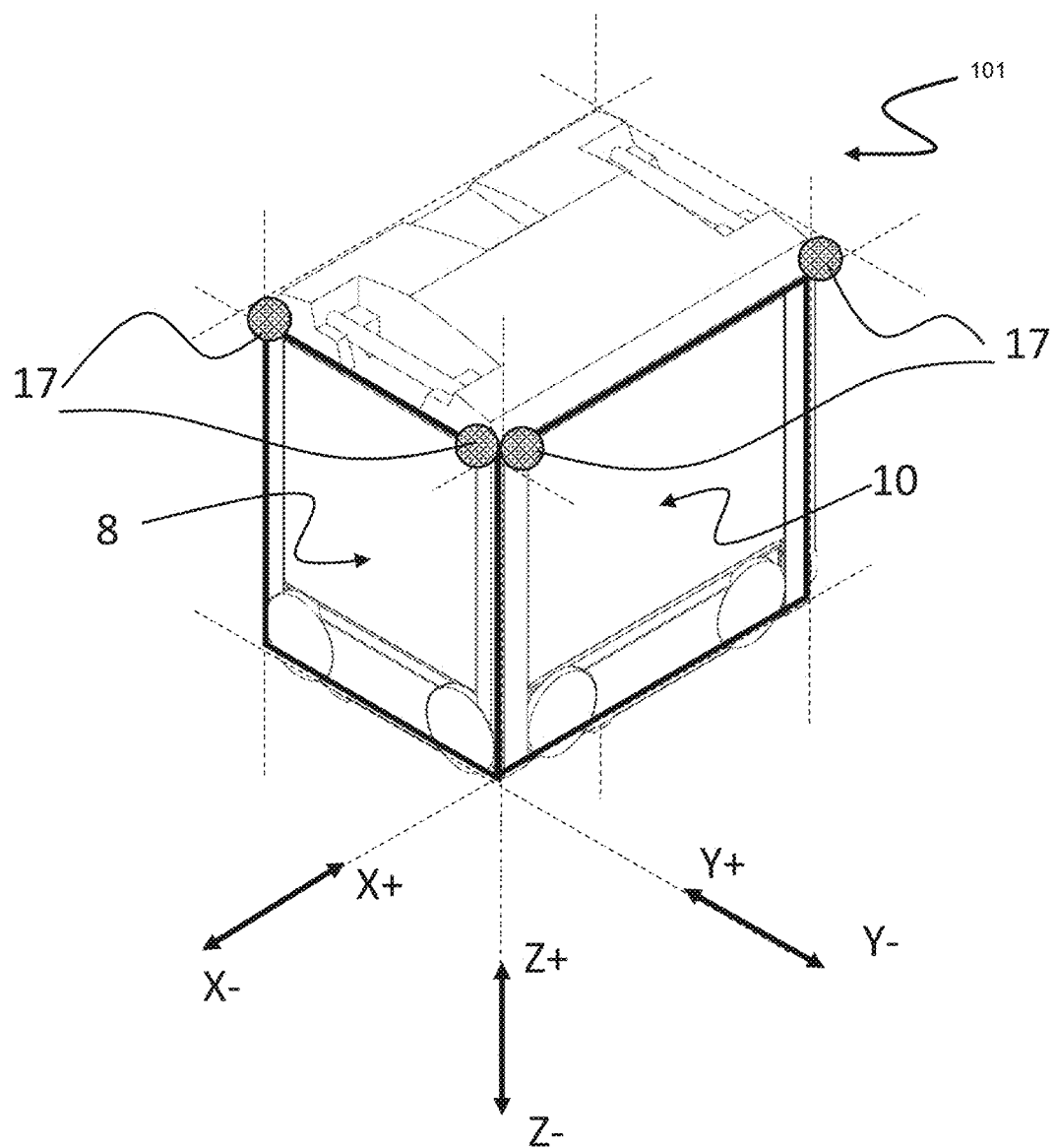
FIG. 6 is a perspective view of a container handling vehicle schematically illustrating side surfaces and possible locations of a proximity sensor system.

FIG. 6 is a perspective view of a container handling vehicle 101, illustrating how the side surfaces 7,8,9,10 may be defined on this type of container handling vehicle 101. The dashed lines represent the horizontal and vertical borders of the side surfaces 7,8,9,10, and as shown, the side surfaces 7,8,9,10 are parallel to respective vertical planes V and the respective first direction X and second direction Y. In this embodiment, the side surfaces 7,8,9,10 thus generally correspond to the physical side surfaces of the container handling vehicles 101 exterior housing, but as will be understood by the person skilled in the art, this may not always be the case, especially for an irregularly shaped container handling vehicle 400. A coordinate system is inserted in FIG. 6 to illustrate how the second side surface 8 faces the first negative direction X–, and the fourth side surface 10 faces the negative second direction Y–. It should however be noted that the coordinates and the orientation of the container handling vehicle 101 in FIG. 6 are merely an example to illustrate how side surfaces 7,8,9,10 may be defined on a container handling vehicle 101. The definition of which side is which, is dependent on the orientation of the container handling vehicle 101 as it is placed on a grid 104, which gives the frame of reference as to what are the positive and negative first X, second Y and third Z directions. Four sensors 17 of the proximity sensor system 4 are exemplified as each being arranged in an upper corner of each side surface 8,10 of the exterior housing of the container handling vehicle 101. As will be apparent, similar sensors may be found on the sides 7 and 9 of the container handling vehicle 101 not shown in FIG. 6. Advantageously, the sensors 17 are arranged near the boundary of a side surface 7,8,9,10 as this allows them to detect the presence of another container handling vehicle moving parallel to said side surface.

In an alternative embodiment of the present invention the proximity sensor is placed on the top most surface of the container handling vehicle. In this embodiment a single proximity sensor can be used. This proximity sensor can be tilted or rotated in order to cover the entire 360° area around the container handling vehicle.

In yet another embodiment of the present invention four proximity sensors can be placed on the top most surface of the container handling vehicle. Using four sensors it is possible to cover the entire 360° area around the container handling vehicle without having to move the sensors. Each sensor covers one side of the container handling vehicle. A first proximity sensor is directed outwards in the positive first direction and is capable of detecting another container handling vehicle within said predetermined distance from the first side surface, and a second proximity sensor is directed outwards in the negative first direction and being capable of detecting another container handling vehicle within said predetermined distance from the second side surface, and a third proximity sensor is directed outwards in the positive second direction and being capable of detecting another container handling vehicle within said predetermined distance from the third side surface, and a fourth proximity sensor is directed outwards in the negative second direction and being capable of detecting another container handling vehicle within said predetermined distance from the fourth side surface.

Figure 7:
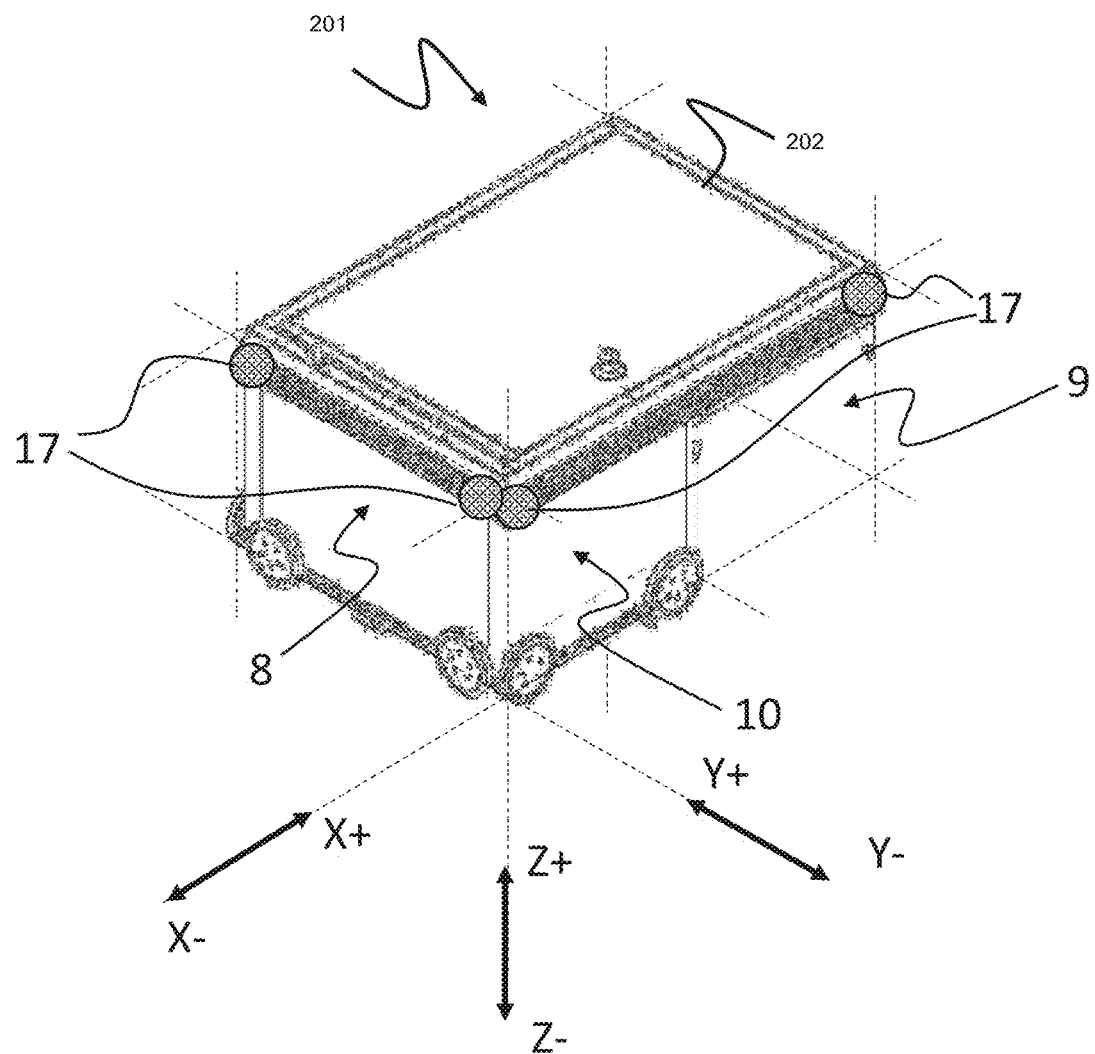
FIG. 7 is a perspective view of a container handling vehicle schematically illustrating side surfaces and possible locations of a proximity sensor system.

FIG. 7 is a perspective view of a container handling vehicle 201, illustrating how the side surfaces 7,8,9,10 may be formed on this type of container handling vehicle 201. In this embodiment, it should be noted that the side surfaces 7,8,9,10 do not generally correspond to the exterior housing of the container handling vehicle 201, apart from the second side surface 8. Due to the cantilever construction of this container handling vehicle 201, it is the outermost part of the cantilever 202 which defines the third side surface 9 since it extends over a grid cell 122 and blocks other container handling vehicles from occupying that cell 122. The fourth side surface 10 thus also extends from the edge of the cantilever 202 to the second side surface 8. Three sensors 17 of the proximity sensor system 4 are exemplified as each being arranged in an upper corner of the second side surface 8 and third side surface 9 of the exterior housing of the container handling vehicle 201, whilst a fourth sensor 17 is arranged near the edge of the cantilever 202. As will be apparent, similar sensors 17 may be found on the sides 7 and 9 not fully shown in FIG. 7, with sensors 17 also being arranged in the outermost edge of the cantilever 202 facing the positive first direction X+. Advantageously, the sensors 17 are arranged near the boundary of a side surface 7,8,9,10 as this allows them to detect the presence of another container handling vehicle moving parallel to said side surface 7,8,9,10.

In an alternative embodiment of the present. invention the proximity sensor is placed on the top most surface of the container handling vehicle. In this embodiment a single proximity sensor can be used. This proximity sensor can be tilted or rotated in order to cover the entire 360° area around the container handling vehicle.

In yet another embodiment of the present invention four proximity sensors can be placed on the top most surface of the container handling vehicle. Using four sensors it is possible to cover the entire 360° area around the container handling vehicle without having to move the sensors. Each sensor covers one side of the container handling vehicle. A first proximity sensor is directed outwards in the positive first direction and is capable of detecting another container handling vehicle within said predetermined distance from the first side surface, and a second proximity sensor is directed outwards in the negative first direction and being capable of detecting another container handling vehicle within said predetermined distance from the second side surface, and a third proximity sensor is directed outwards in the positive second direction and being capable of detecting another container handling vehicle within said predetermined distance from the third side surface, and a fourth proximity sensor is directed outwards in the negative second direction and being capable of detecting another container handling vehicle within said predetermined distance from the fourth side surface.

Figure 8A:
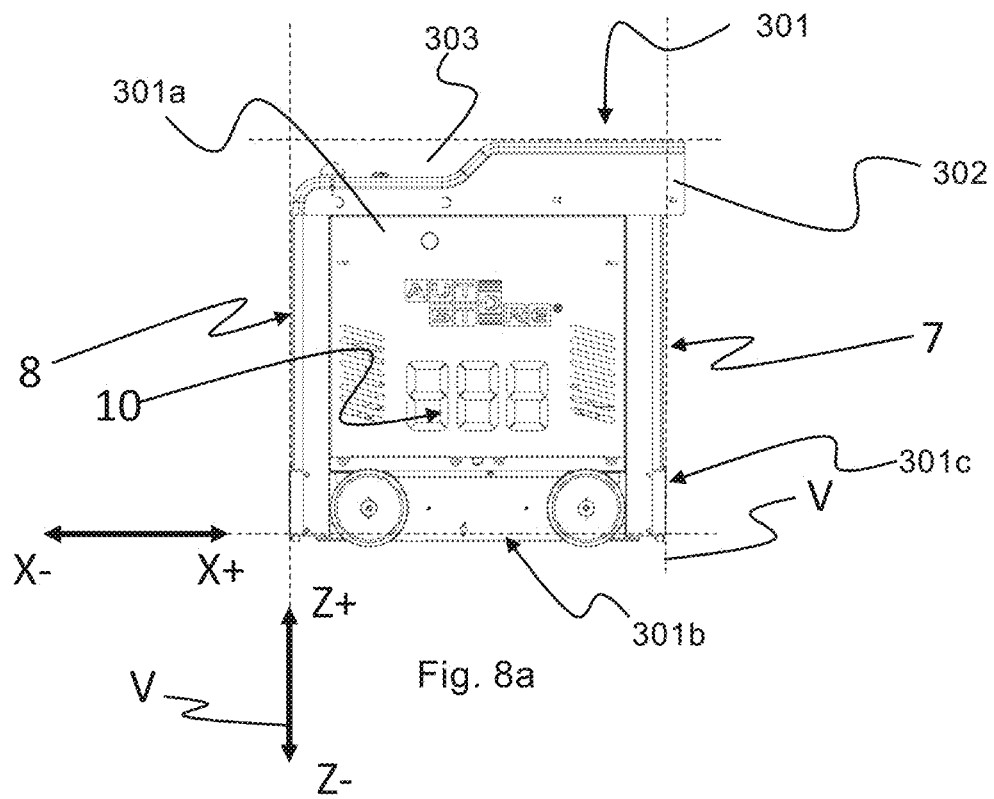
FIG. 8a is a side view of a container handling vehicle comprising a protruding section, schematically illustrating side surfaces on said vehicle.
Figure 8B:
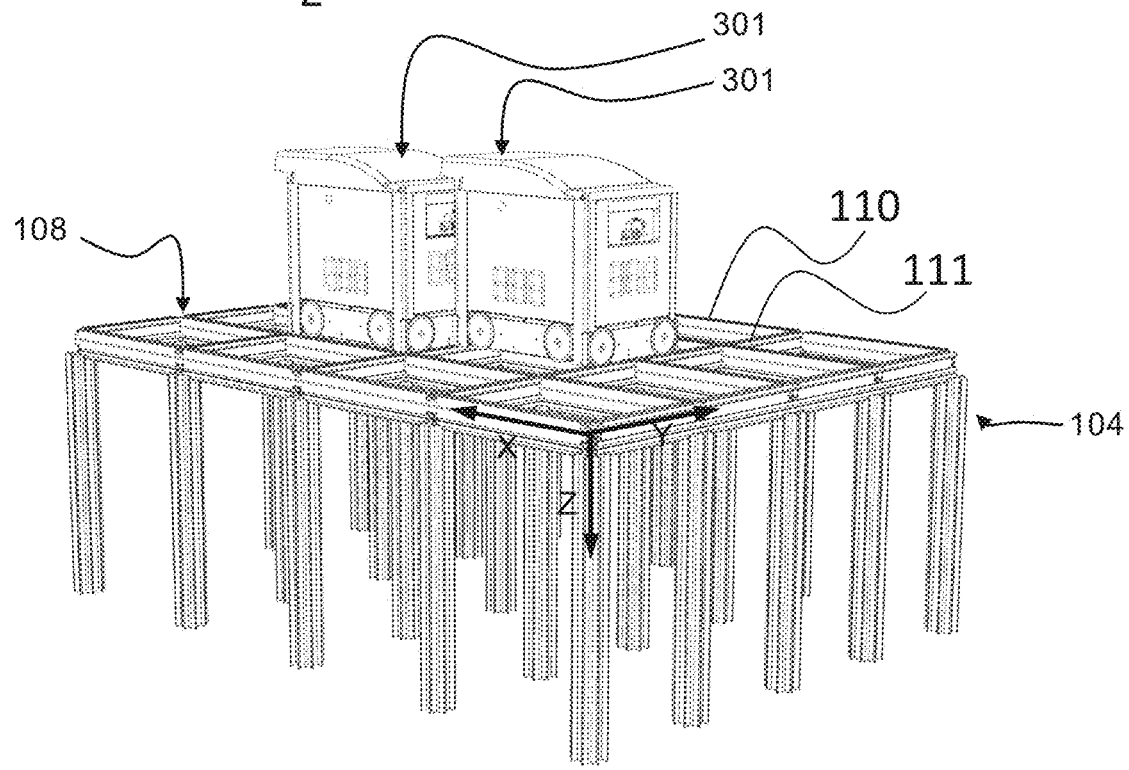
FIG. 8b is a perspective view of two container handling vehicles, of the same type shown in FIG. 8a, operating on adjacent rows of grid cells.

FIGS. 8a and 8b illustrate another type of container handling vehicle 301 with a contact area against the rail system 108 which has a horizontal extension that is equal to the lateral area defined by a grid column 112 or grid cell 122. The container handling vehicle 301 also comprises a protruding section 302, as shown in FIG. 8*a*, which extends laterally beyond the contact area of the container handling vehicle 301 and, when the container handling vehicle 301 is positioned above a grid cell 122, into a neighbouring grid cell 122. The container handling vehicle 301 comprises a vehicle body 301*a* and drive means 301*b* for driving in the first direction X, and drive means 301*c* for driving in the second direction Y. Though the drive means 301*c* in the second direction Y are not shown in the side view of FIG. 8*a*, they can be seen in FIG. 8*b* and are similarly arranged as the drive means 301*b* in the first direction X.

However, the protruding section 302 does not prevent another container handling vehicle 301 from travelling over the neighbouring grid cell 122, i.e. the grid cell 122 into which the protruding section 302 of the first vehicle extends. To achieve this, the container handling vehicles 301 each comprise a recessed section 303 arranged opposite the protruding section 302, which recessed section 303 is capable of accommodating the protruding sections 302 of other vehicles 301 when they pass over a neighbouring grid cell 122. The recessed section 303 may have a shape which is complementary to the shape of the protruding section 302 and may extend across the whole width or length of the container handling vehicle 301, thus allowing vehicles 301 to pass each other over adjacent grid cells 122. When the vehicles 301 operate on the rail system 108, the recessed section 303 of each container handling vehicle 301 is capable of accommodating the protruding sections 302 of other container handling vehicles 301 when they pass over a neighbouring grid cell 122, thus allowing container handling vehicles 301 to travel along neighbouring rows of grid cells, as illustrated in FIG. 8*b*.

The container handling vehicle 301 in FIGS. 8*a* and 8*b* is included herein to illustrate that a protruding section 301 does not necessarily block access to an adjacent grid cell 122, but that this is dependent on the shape of the container handling vehicle. It will therefore be apparent to the person skilled in the art that other variations of container handling vehicles with protrusions, or even without corresponding recesses, can be employed on a rail system 108 without the protrusions acting to block other container handling vehicles from accessing adjacent grid cells 122. The difference between the container handling vehicles of FIGS. 7 and 8 is therefore noteworthy, as both comprise parts extending over an adjacent grid cell 122, yet only the container handling vehicle 201 of FIG. 7 has a side surface 9 defined from the edge of the cantilever 202, contrary to the container handling vehicle 301 of FIG. 8, where the first side surface 7 is not defined by the outermost edge of the protruding section 302.

Figure 9A:
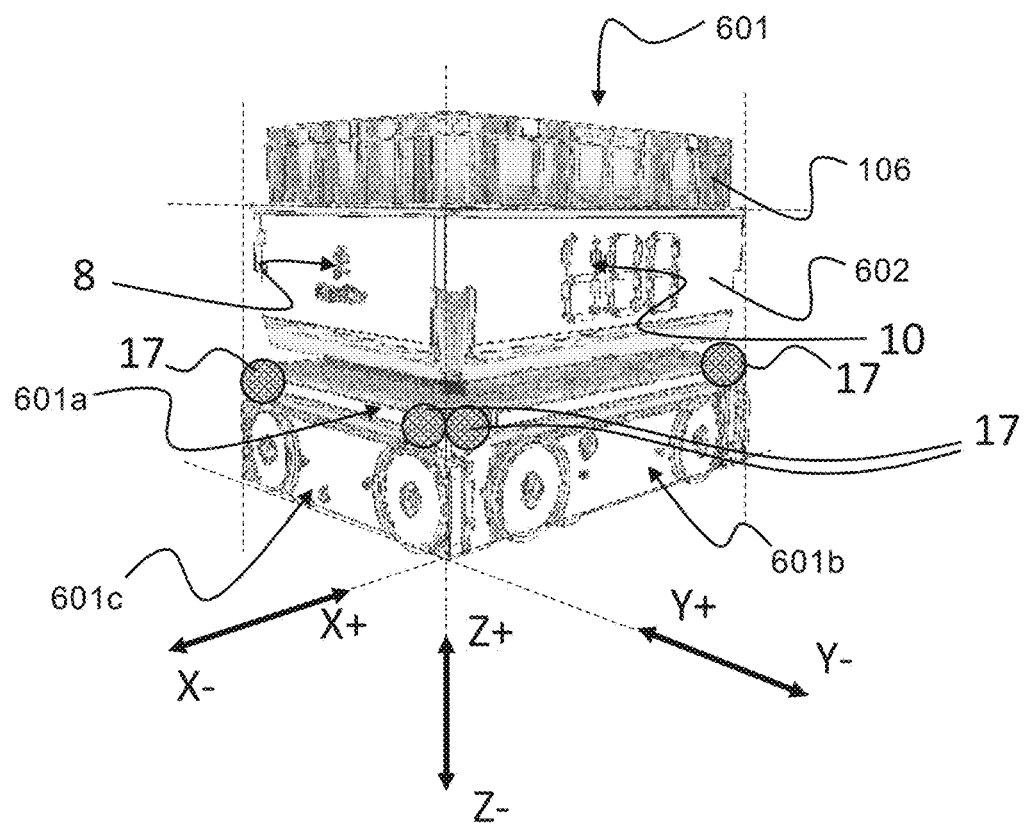
FIG. 9a is a perspective view of a container handling vehicle for container delivery, schematically illustrating side surfaces on said vehicle.
Figure 9B:
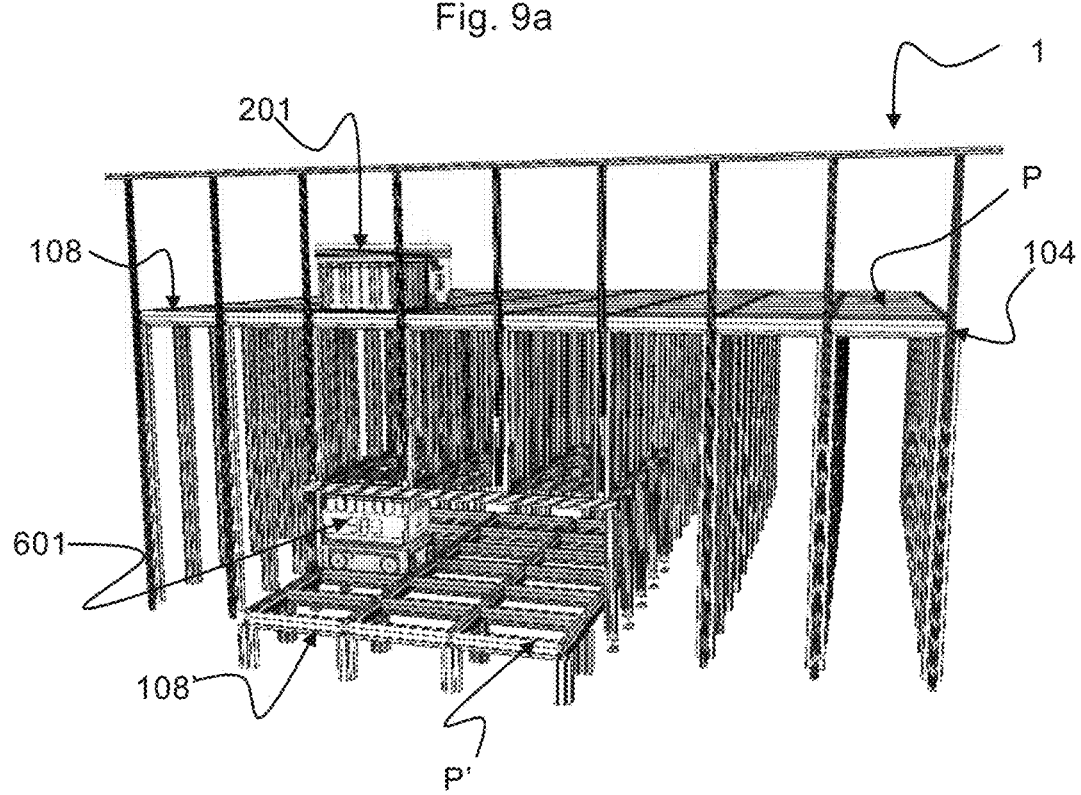
FIG. 9b is a perspective view of a storage system comprising a cantilever container handling vehicle operating on a rail system of a grid, and a container handling vehicle for container delivery operating on a lower rail system.

FIG. 9*a* and 9*b* illustrate another aspect of a container handling vehicle according to the invention, where a container handling vehicle 601 for container delivery, is shown in FIG. 9*a* an in relation to an automated storage and retrieval system 1 in FIG. 9*b*.

As FIG. 9*a* illustrates, the container delivery vehicle 601 is arranged for top-down receival of a storage container 106, and therefore comprises a container carrier 602 arranged above a vehicle body 601*a* to receive a storage container 106. The container delivery vehicle 601 comprises drive means 301*b* in first direction X, and drive means 301*c* in the second direction Y similar to that of the other aforementioned container handling vehicles 101,201,301. Side surfaces 7,8,9,10 are defined for the container delivery vehicle 601 as for the other container handling vehicles, with the second 8 and fourth 10 side surfaces visible in FIG. 9*a*. Possible proximity sensor locations are also illustrated by reference 17.

FIG. 9*b* illustrates a container delivery vehicle 601 operating on a rail system 108' below the rail system 108 of a storage grid 104. The delivery rail system 50 may be constructed in the same way or a similar way as the rail system 108 for the container handling vehicles 200,300.

Figure 2A:
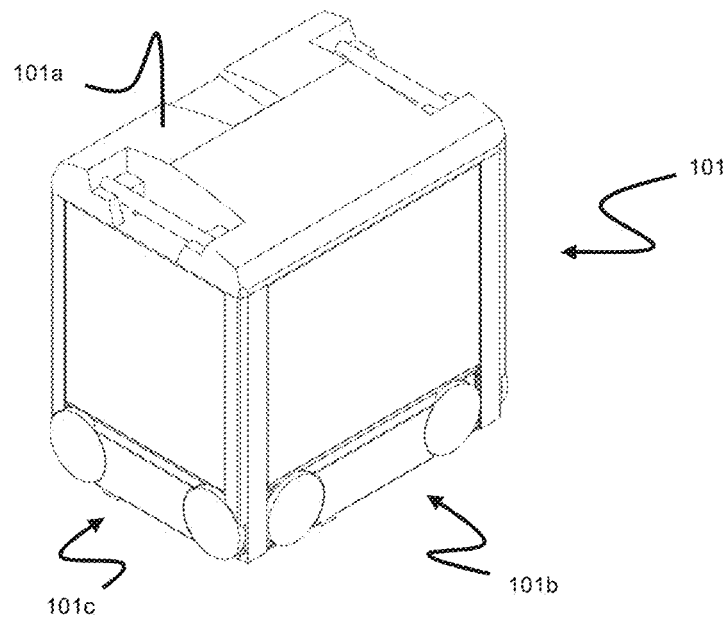
FIG. 2a is a perspective view of a prior art container handling vehicle having a centrally arranged cavity for containing storage containers therein.
Figure 2B:
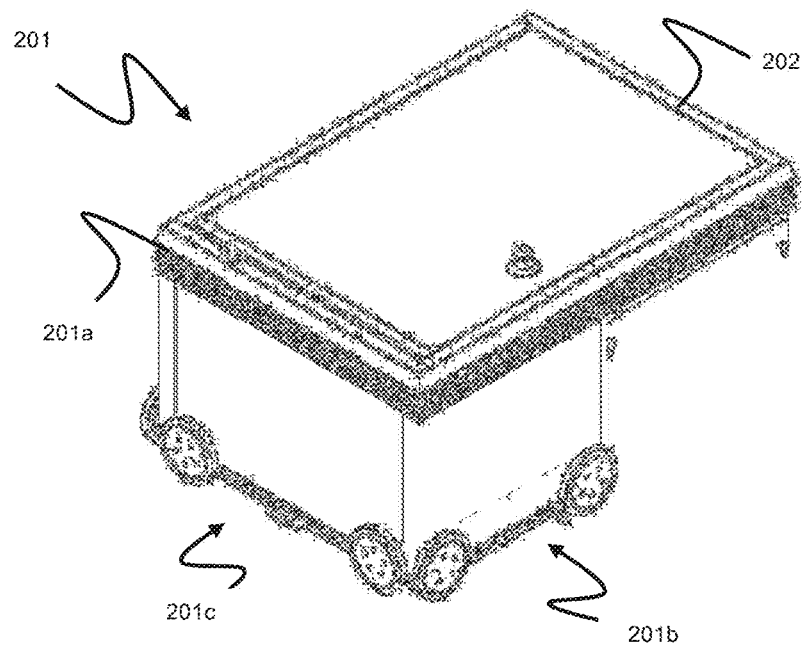
FIG. 2b is a perspective view of a prior art container handling vehicle having a cantilever for containing storage containers underneath.

A container handling vehicle 201, according to the embodiment of FIG. 2*b* is shown operating on the rail system 108 of the storage grid 104. However, as will be apparent to the person skilled in the art, any kind of container handling vehicle 101,201,301 may be operated on the rail system 108 of the grid, for example according to the embodiments illustrated in FIGS. 6-8. The container handling vehicles 201 may thus lower storage containers down to container delivery vehicles 601 operated on the lower rail system 108'. The container delivery vehicles 601 are typically arranged for delivery of storage containers 106 to an access point (not shown) at the periphery of the rail system 108, where the storage containers 106 may be picked. Though not illustrated herein, the lower rail system 108' typically comprises a multitude of container delivery vehicles 601, and as they move between cells below port columns and access points on the periphery of the lower rail system 108', problems of congestion and queuing may arise. Thus, the invention is advantageously applied to rail systems 108' with container delivery vehicles 601 in a similar manner as for container handling vehicles 101,201,301 of a rail system 108 of a grid 104

Figure 10:
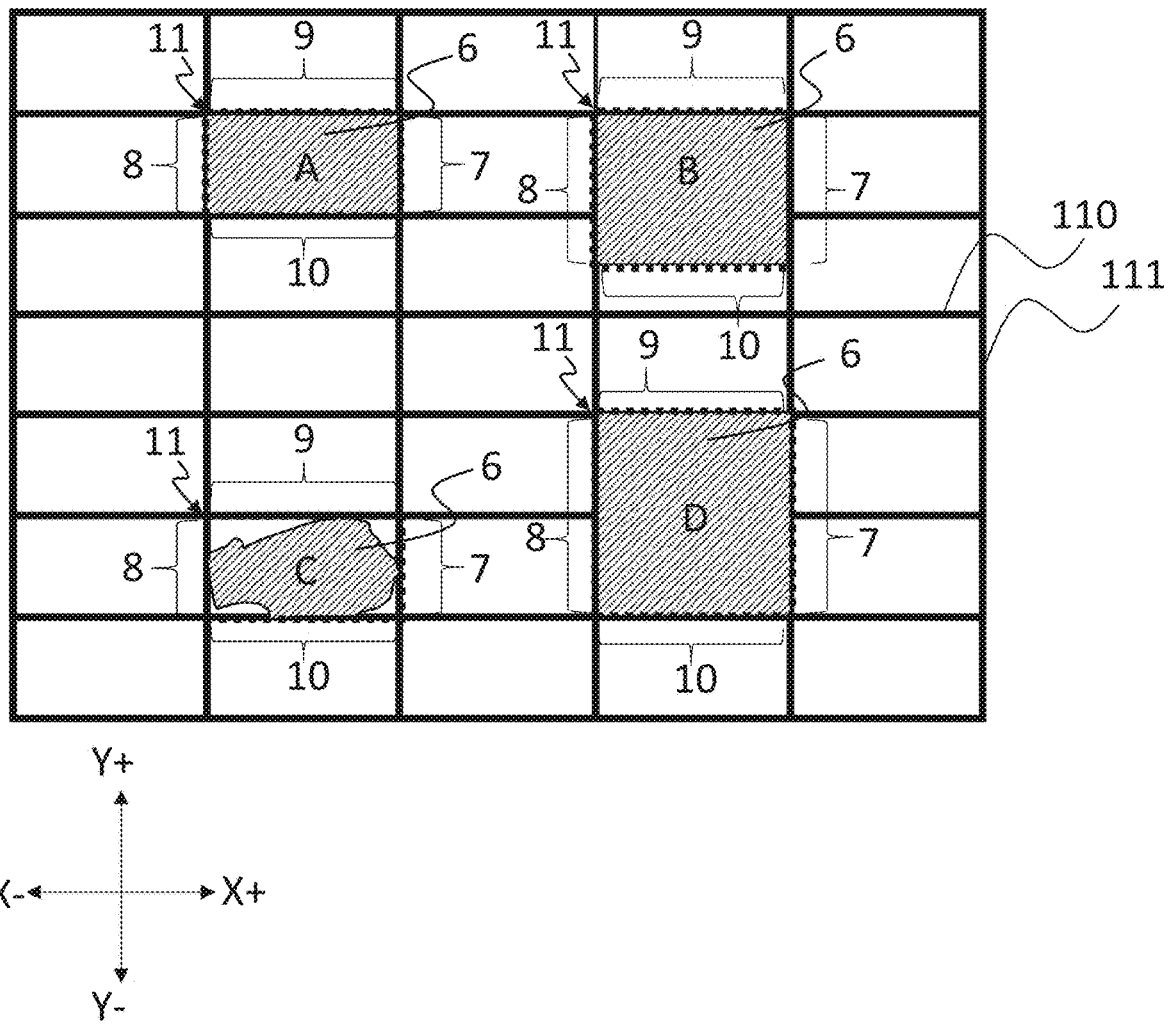
FIG. 10 is a schematic top view of a rail system, illustrating the projection and side surfaces formed by several different container handling vehicles.

FIG. 10 illustrates the projection 6 on a rail system, side surfaces 7,8,9,10 and rectangular cross sections 11 formed by several different examples of container handling vehicles. The rectangular cross section 11 labelled A could for example be from the container handling vehicle 101 of FIG. 2*a*, FIG. 6 or FIG. 9, as the rectangular cross section 11 formed by its side surfaces is equal to the lateral area defined by a grid cell 122. The rectangular cross section 11 labelled B is equal to the area defined by one (in the X direction) times one and a half (in the Y direction) grid cells 122, and could for example be from a container handling vehicle with some similarities to the one illustrated in FIG. 2*a* but where one side wall of the vehicle is enlarged and takes up the area of half a grid cell 122. The rectangular cross section 11 labelled C has an irregular projection and may be of a container handling vehicle 400 similar to that of the illustrative example of FIG. 5. The rectangular cross section 11 labelled D, could for example be from the container handling vehicle 201 of FIG. 2*b* or FIG. 7. However, it is conceivable that a container handling vehicle similar to that of FIG. 2*a*, with a lateral area corresponding to two grid cells 122 and capable of lifting two storage containers 106 simultaneously from adjacent grid cells 122 could also form a rectangular cross section 11 as that labelled D. As will be apparent to the person skilled in the art based on the disclosure of the invention herein, many more variations of container handling vehicles are conceivable.

Figure 11:
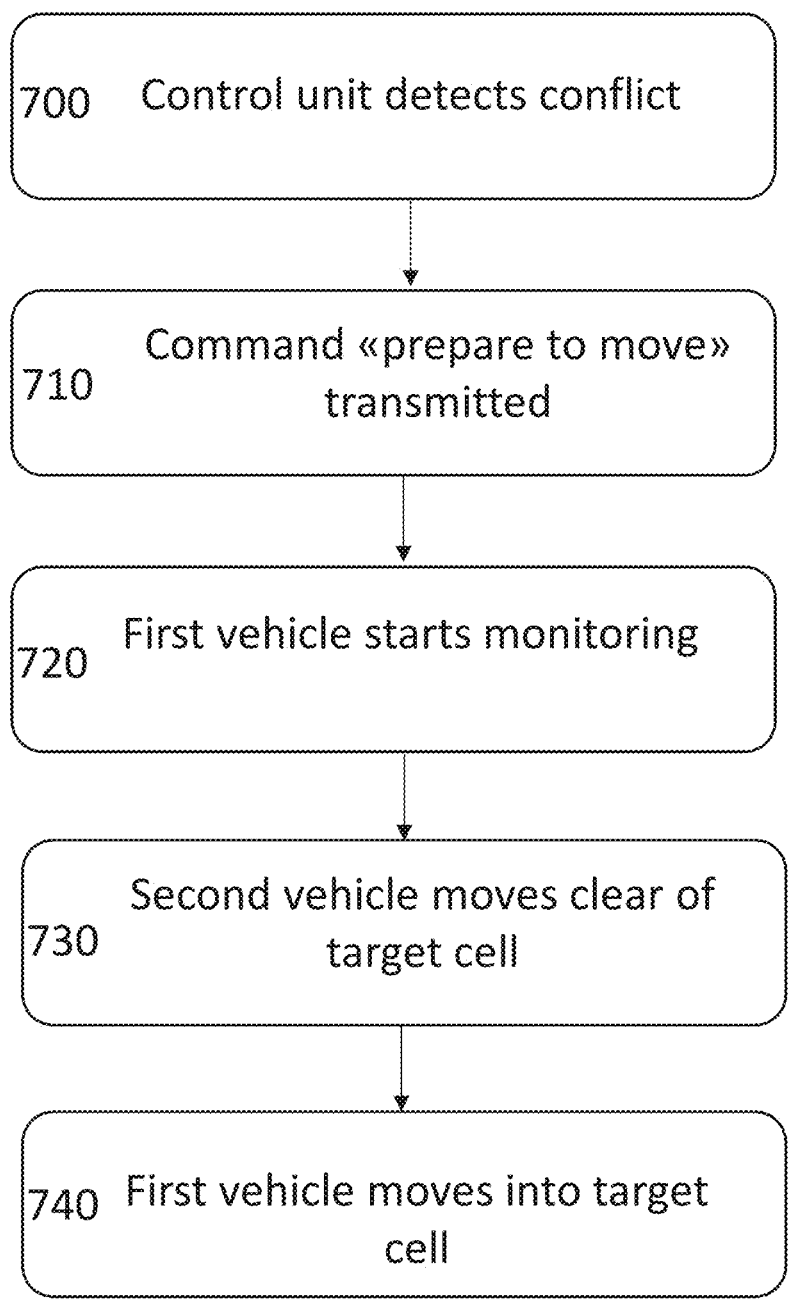
FIG. 11 is a flow chart illustrating the steps of a method of operating an automated storage and retrieval system.

FIG. 11 is a flow diagram schematically representing the steps of a method for operating an automated storage and retrieval system 1. The method is typically initiated by a step 700 where the central control unit 15 detects a conflict over a grid cell 122 by two container handling vehicles 2,3. A container handling vehicle on route to a target cell 12 is labelled as a first container handling vehicle 2, and the container handling vehicle blocking access to the target cell 12 of the first container handling vehicle 2 is labelled as a second container handling vehicle 3. A target cell may typically be a grid cell 122, on rail system 108,108', where a container handling vehicle has received a command from the central control unit 15 to move. In the next step, the first container handling vehicle 2 moves to a grid cell 122 adjacent to its target cell 12, and receives a data signal from the central control unit 15 which it processes in its vehicle control unit 14. The data signal comprises a command to activate the first container handling device's 2 proximity sensor system 4, i.e. to start monitoring for another container handling vehicle in the direction of the target cell 12 which coincides with its the direction of travel. The data signal may also comprise specification of a predetermined distance D within which the first container handling vehicle 2 is to detect the second container handling vehicle 3 and to move into the target cell 12 once the second container handling 3 vehicle is beyond said distance D. Another data signal is transmitted from the central control unit 15 to the vehicle control unit 14 of the second container handling vehicle 3 commanding the second container handling vehicle 3 to move clear of the target cell 12. In some aspects, the second container handling vehicle 3 may have already received a command to move clear of the target cell 12 before first container handling vehicle 2 receives a command to activate its proximity sensor system 4 and move, but the second container handling vehicle 3 has not yet moved, for example because it is busy lowering or lifting storage containers 106. Thus the data signal from the central control unit to the first container handling vehicle 2 is illustrated by step 710, and the activation of its proximity sensor system 4 by step 720. In any case, the second container handling vehicle 3 moves away from its blocking position of the target cell 12, as illustrated by step 730. The vehicle control unit 14 of the first container handling vehicle 2 continuously monitors data from its proximity sensor system 4, and upon the predetermined distance D being free from an object i.e. the second container handling vehicle 3, the vehicle control unit 14 controls the first container handling vehicle 2 to move into the target cell 12 represented by step 740. Depending on the direction of travel of the second container handling vehicle 3 relative to the first container handling vehicle 3, the vehicle control unit 14 may continue to monitor whether the second container handling vehicle 3 is within the predetermined distance during movement of the first container handling vehicle 2.

In the following, with reference to FIGS. 12-15, various steps of methods of operating an automated storage and retrieval system are exemplified in accordance with the invention. To illustrate these, a schematic rail system and two of one type of container handling vehicle 2,3 are used throughout FIGS. 12-15. The container handling vehicles 2,3 exemplified in FIGS. 12-15 have a rectangular cross section 11 equal to one by one and a half grid columns (.i.e. 1×1.5), as described in relation to portion B of FIG. 10, and comprise a container receiving space 13 arranged to one side of the vehicle body. The container handling vehicles 2,3 may further comprise a proximity sensor system 4 such as that shown in FIGS. 6-9, but only activated sensors 17 are illustrated in FIGS. 12-15, i.e. sensors which monitor whether the second container handling vehicle 3 is within the predetermined distance D. However, the remaining sensors 17 may also be active during execution of the method.

FIG. 12 is a schematic top view of a rail system 108, illustrating steps of a method where a first container handling vehicle 2 and a second container handling vehicle 3 are located on adjacent grid cells 122 when the method is initiated, as illustrated in portion A by the central control unit 15 transmitting a data signal to each of the container handling vehicles 2,3. The second container vehicle 3 is illustrated as covering the entire target cell 12, and is oriented such that its container receiving space 13 is also over the target cell 12. Such a starting point as shown in FIG. 12, may be common around ports, where the target cell 12 is located over a port column 19,20 through which storage containers 106 are dropped off and picked up. The first container handling vehicle 2 thus activates it proximity sensor system 4 as represented by the black dots 17 and continuously monitors the predetermined distance D as it moves into the target cell 12 to avoid collision with the second container handling vehicle 3.

in portion B of FIG. 12, the second container handling vehicle 3 is moving, as illustrated by the arrow and the position of the vehicle 3 across two grid cells 122. The proximity sensor system 4 of the first container handling vehicle 2 is monitoring the presence of the second container handling vehicle 3 within the predetermined distance D, which may typically be set to 2 meters when the container handling vehicles 2,3 move in parallel.

Portion C of FIG. 12 thus illustrates first container handling vehicle 2 after it has detected that there is no second container handling vehicle 3 within the predetermined distance D, and both container handling vehicles 2,3 are moving across the rail system 108. The first container handling vehicle's 2 proximity sensor system 4 may thus continuously monitor in the first positive direction X+ in order to avoid a collision, for example if the second container handling vehicle 3 should unexpectedly stop. Note that the second container handling vehicle 3 is partially within the target cell 12 when the first container handling vehicle 2 starts to move.

Portion D of FIG. 12 illustrates the end result of the method, where the first container handling vehicle 2 has moved over the target cell 12 and the second container handling vehicle 3 has moved to a new position on the rail system 108. Typically, the new position for the second container handling vehicle 3 may be related to a new task such as retrieving or depositing a storage container 106 somewhere in the grid 104.

FIG. 13 is a schematic top view of a rail system 108, illustrating steps of a method where a first container handling vehicle 2 is located on a grid cell 122 adjacent to its target cell 12 which is unoccupied, yet the second container handling vehicle 3 is blocking access to the target cell 12 due to size and thus the rectangular cross section 11 of the first container handling vehicle 2. The steps illustrated by the portions A-B in FIG. 13 are essentially the same as for the steps in FIG. 12, however only the sensor 17 in the corner of the first container handling vehicle 2 which is closest to the second container handling vehicle 3 is required to be activated. The central control unit 14 may transmit the direction of travel and position for the second container handling vehicle 3, whereupon the vehicle control unit 14 of the first container handling vehicle 2 may determine which sensors are required to monitor for the presence of the second container handling vehicle 3 within the predetermined distance. Alternatively, the central control unit 15 may give a direct command to the first container handling vehicle 2 regarding which sensors are to be activated.

FIG. 14 is a schematic top view of a rail system 108, illustrating steps of a method where a first container handling vehicle 2 is located on a grid cell 122 adjacent to its target cell 12 which is partially occupied by a second container handling vehicle 3, due to the orientations of the two vehicles 2,3 on the rail system 108 being different. The steps illustrated by the potions A-B in FIG. 13 are essentially the same as for the steps in FIG. 14.

FIG. 15 is a schematic top view of a rail system 108, illustrating steps of a method where a first container handling vehicle 2 and a second container handling vehicle 3 are initially located on adjacent grid cells 122 similarly to the starting point of the method in FIG. 12. Contrary to the steps of FIG. 12 however, the second container handling vehicle 3 moves in a direction orthogonal to the direction in which the first container handling vehicle 2 is to travel, as illustrated in Portion B of FIG. 15. Thus, the first container handling vehicle's 2 sensor 17 arranged in the corner of the direction of travel of the second container handling vehicle 3 is activated. Furthermore, the predetermined distance D which the proximity sensor system 4 is to detect the second container handling vehicle 3 may be less than 2 (two) meters, for example 10 (ten) centimeters, as it is only required to detect when the second container handling vehicle 3 has passed its corner. The vehicle control unit 14 of the first container handling vehicle 2 may receive information from the central control unit 15 regarding the predetermined distance D and which sensor to activate, or the vehicle control unit 14 may determine the distance and which sensors to activate by receiving information regarding the direction of travel of the second container handling vehicle 3. Once the sensor 17 of the first container handling vehicle 2 has detected that there is no obstruction, said container handling vehicle 2 can move into the target cell 12. In a prior art execution of the method illustrated in FIG. 15, the central control unit 15 could not know that the target cell 12 was free until the second container handling vehicle 3 had moved at least to the position illustrated in portion D of FIG. 15, thus leaving the first container handling device 3 to await moving in to the target cell 12 for an excessive amount of time. The steps of the method in FIG. 15 thus clearly illustrate the time saving aspects of the invention.

The predetermined distance D may be dynamically adapted to the speed the container handling vehicles are moving in. The container handling vehicles are set to have a default predetermined distance D for a given speed. The container handling vehicles themselves will adapt the distance D to the speed they are traveling in.

In the preceding description, various aspects of a method of operating an automated storage and retrieval system, and an automated storage and retrieval system according to the invention have been described with reference to the illustrative embodiment. However, this description is not intended to be construed in a limiting sense. Various modifications and variations of the illustrative embodiment, as well as other embodiments of the system and the method which are apparent to persons skilled in the art, are deemed to lie within the scope of the present invention as defined by the following claims.

| Reference numerals: | |
| --- | --- |
| 1 | Storage and retrieval system |
| 2 | First container handling vehicle |
| 3 | Second container handling vehicle |
| 4 | Proximity sensor system |
| D | Predetermined distance |
| 5 | Side surface |
| 6 | Projection of first container handling vehicle |
| 7 | First side surface |
| 8 | Second side surface |
| 9 | Third side surface |
| 10 | Fourth side surface |
| 11 | Rectangular extent |
| 12 | Target cell |
| 13 | Container receiving space |
| 14 | Vehicle control unit |
| 15 | Central control unit |

| -continued | |
| --- | --- |
| Reference numerals: | |
| 16 | Data signal |
| 17 | Proximity sensor |
| 19 | Port column |
| 20 | Port column |
| 100 | Framework structure |
| 101 | Container handling vehicle |
| 101a | Vehicle body of the container handling vehicle 101 |
| 101b | Drive means in first direction (X) |
| 101c | Drive means in the second direction (Y) |
| 102 | Upright members of framework structure |
| 103 | Horizontal members of framework structure |
| 104 | Grid |
| 105 | Storage column |
| 106 | Storage container |
| 106' | Particular position of storage container |
| 107 | Stack |
| 108 | Rail system |
| 108' | Rail system for delivery vehicle |
| 110 | Parallel rails in first direction (X) |
| 110a | First rail of neighboring rails 11 |
| 110b | Second rail of neighboring rails 11 |
| 111 | Parallel rails in second direction (Y) |
| 111a | First rail of neighboring rails 12 |
| 111b | Second rail of neighboring rails 12 |
| 112 | Grid column |
| 115 | Grid opening |
| 122 | Footprint/grid cell/storage cell |
| 201 | Cantilever container handling vehicle |
| 201a | Vehicle body of the cantilever container handling vehicle 201 |
| 201b | Drive means in first direction (X) of the cantilever container handling vehicle |
| 201c | Drive means in second direction (Y) of the cantilever container handling vehicle |
| 202 | Cantilever section |
| 301 | Container handling vehicle with protruding section |
| 301a | Container handling vehicle body |
| 301b | Drive means in first direction (X) of the container handling vehicle with protruding section |
| 301c | Drive means in second direction (Y) of the container handling vehicle with protruding section |
| 302 | Protruding section |
| 303 | Recessed section |
| 400 | Irregularly shaped container handling vehicle |
| 601 | Remotely operated delivery vehicle |
| 601a | Vehicle body of the delivery vehicle 601 |
| 602 | Container carrier of the delivery vehicle 601 |
| 700 | Control unit detects conflict |
| 710 | Command «prepare to move» transmitted |
| 720 | First vehicle activates sensor system |
| 730 | Second vehicle moves clear of target cell |
| 740 | First vehicle moves into target cell |
| X | First direction |
| X− | Negative first direction |
| X+ | Positive first direction |
| Y | Second direction |
| Y+ | Positive second direction |
| Y− | Negative second direction |
| Z | Third direction |
| P | Horizontal plane |
| P' | Horizontal plane of delivery vehicle rail system 108' |
| V | Vertical plane |
| D | Predetermined distance |

The invention claimed is:

1. A method of operating an automated storage and retrieval system, the automated storage and retrieval system comprising:

a rail system comprising a first set of parallel rails arranged in a horizontal plane and extending in a first direction (X), and a second set of parallel rails arranged in the horizontal plane and extending in a second direction (Y) which is orthogonal to the first direction (X), which first and second sets of rails form a grid pattern in the horizontal plane comprising a plurality of adjacent grid cells, a central control unit configured to receive, transmit and process data signals of a plurality of container handling vehicles for handling storage containers of the automated storage and retrieval system, each container handling vehicle comprising:

a vehicle body, a wheel assembly provided on the vehicle body, the wheel assembly being configured to move the vehicle along the rail system in both of the first direction (X) and the second direction (Y), a vehicle control unit configured to receive data signals from, transmit data signals to and process data signals of the central control unit, and a proximity sensor system configured to detect another container handling vehicle of said plurality of container handling vehicles and determine whether or not it is within a predetermined distance, wherein the method comprises:

detecting with the central control unit that access of a first container handling vehicle to a target cell, which is one of the plurality of grid cells, is blocked by a second container handling vehicle, transmitting a data signal from the central control unit to the vehicle control unit of the first container handling vehicle commanding the first container handling vehicle to move into the target cell when the second container handling vehicle is beyond said predetermined distance.

2. The method according to claim 1, wherein the method comprises:

transmitting a data signal from the central control unit to the vehicle control unit of the second container handling vehicle commanding the second container handling vehicle to move clear of the target cell.

3. The method according to claim 2, wherein the method comprises:

transmitting a data signal from the central control unit to the vehicle control unit of the second container handling vehicle commanding the second container handling vehicle to move clear of the target cell and to another location of the rail system.

4. The method according to claim 2, wherein the method comprises:

transmitting a data signal from the central control unit to the vehicle control unit of the second container handling vehicle (3) commanding the second container handling vehicle to move in a direction (X,Y) parallel to the direction (X,Y) between the target cell and the first container handling vehicle.

5. The method according to claim 4, wherein the method comprises:

continuously monitoring with the proximity sensor system of the first container handling vehicle as it moves into the target cell to detect if the second container handling vehicle is within a predetermined distance.

6. The method according to claim 2, wherein the method comprises:

transmitting a data signal from the central control unit to the vehicle control unit of the second container handling vehicle commanding the second container handling vehicle to move in a direction (X,Y) orthogonal to the direction (X,Y) between the target cell and the first container handling vehicle.

7. The method according to claim 1, where the proximity sensor system of the first container handling vehicle measures the predetermined distance (D) from a side surface of a plurality of side surfaces of the first container handling vehicle and wherein the predetermined distance is defined in a direction (X,Y) of the rails.

8. The method according to claim 7, wherein the method comprises:

determining with the vehicle control unit from which side surface of the first container handling vehicles to detect the second container handling vehicle.

9. The method according to claim 1, wherein the method comprises:

transmitting a data signal from the central control unit to the vehicle control unit of the first container handling vehicle to specify the predetermined distance.

10. An automated storage and retrieval system comprising:

a rail system comprising a first set of parallel rails arranged in a horizontal plane and extending in a first direction (X), and a second set of parallel rails arranged in the horizontal plane and extending in a second direction (Y) which is orthogonal to the first direction (X), which first and second sets of rails form a grid pattern in the horizontal plane comprising a plurality of adjacent grid cells;

a central control unit configured to receive, transmit and process data signals of a plurality of container handling vehicles for handling storage containers of the automated storage and retrieval system, each container handling vehicle comprising:

a vehicle body, a wheel assembly provided on the vehicle body, the wheel assembly being configured to move the vehicle along the rail system in at least one of the first direction (X) and the second direction (Y), a vehicle control unit configured to receive, transmit and process data signals of the central control unit;

each of said plurality of container handling vehicles comprises a proximity sensor system configured to detect another container handling vehicle of said plurality of container handling vehicles and determine whether or not it is within a predetermined. distance, wherein the central control unit is configured to:

detect that access of a first container handling vehicle to a target cell, which is one of the plurality of grid cells, is blocked by a second container handling vehicle transmit a data signal from the central control unit to the vehicle control unit of the first container handling vehicle commanding the first container handling vehicle to move into the target cell when the second container handling vehicle is beyond said predetermined distance.

11. The system according to claim 10, where the predetermined distance is measured from a side surface of a container handling vehicle in a direction (X,Y) of the rails.

12. The system according to claim 11, where each container handling vehicle comprises four vertical side surfaces: a first side surface facing a positive first direction (X+), a second side surface facing a negative first direction (X−), a third side surface facing a positive second direction (Y+) and a fourth side surface facing a negative second direction (Y−), wherein the positive and negative directions are opposite of each other; and where the first side surface and the second side surface extend between the third side surface and the fourth side surface such that the side surfaces form a rectangular cross section in a horizontal plane.

13. The system according to claim 12, wherein the proximity sensor system comprises at least any of:

a first part sensor system (4X+) directed outwards from the first side surface in the positive first direction (X+) and being capable of detecting another container handling vehicle within said predetermined distance from the first side surface, and a second part sensor system (4X−) directed outward from the second side surface in the negative first direction (X−) and being capable of detecting another container handling vehicle within said predetermined distance from the second side surface, a third part sensor system (4Y+) directed outwards from the third side surface in the positive second direction (Y+) and being capable of detecting another container handling vehicle within said predetermined distance from the third side surface, and a fourth part sensor system (4Y−) directed outwards from the fourth side surface in the negative second direction (Y−) and being capable of detecting another container handling vehicle within said predetermined distance from the fourth side surface.

14. The system according to claim 12, wherein the proximity sensor system comprises at least two proximity sensors, wherein each of the at least two proximity sensors are arranged to detect another container handling vehicle at boundaries of any of the side surfaces in the horizontal plane.

15. The system according to any of claim 12, wherein the rectangular cross section of any of the first or second container handling vehicles corresponds to an integer multiple of grid cells.

16. The system according to claim 12, wherein the rectangular cross section of any of the first or second container handling vehicles corresponds to more than one grid cell.

* * * * *